(12) United States Patent
Yu et al.

(10) Patent No.: US 11,424,811 B2
(45) Date of Patent: Aug. 23, 2022

(54) TECHNIQUES FOR ANALOG BEAMFORMING

(71) Applicant: Intel Corporation, Santa Clara, CA (US)

(72) Inventors: Zhibin Yu, Unterhaching (DE); Ansgar Scherb, Nuremberg (DE); Andre Janssen, Munich (DE); Bertram Gunzelmann, Koenigsbrunn (DE); Yeong-Sun Hwang, Germering (DE); Holger Neuhaus, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/251,228

(22) PCT Filed: Jul. 31, 2019

(86) PCT No.: PCT/US2019/044338
§ 371 (c)(1),
(2) Date: Dec. 11, 2020

(87) PCT Pub. No.: WO2020/033197
PCT Pub. Date: Feb. 13, 2020

(65) Prior Publication Data
US 2021/0266058 A1    Aug. 26, 2021

(51) Int. Cl.
*H04B 7/08* (2006.01)
(52) U.S. Cl.
CPC ..................................... *H04B 7/08* (2013.01)
(58) Field of Classification Search
CPC ........ H04B 7/08; H04B 7/088; H04B 7/0695; H04B 7/0617
See application file for complete search history.

(56) References Cited

U.S. PATENT DOCUMENTS

| 4,316,192 A | * | 2/1982 | Acoraci | ................. | H01Q 25/02 |
| | | | | | 342/373 |
| 5,859,610 A | * | 1/1999 | Lenormand | ............... | G01S 3/30 |
| | | | | | 342/356 |

(Continued)

FOREIGN PATENT DOCUMENTS

| CN | 107070820 A | 8/2017 |
| EP | 3261266 A1 | 12/2017 |

OTHER PUBLICATIONS

International Search Report issued for the PCT application No. PCT/US2019/044338, dated Oct. 24, 2019, 3 pages (for informational purpose only).

(Continued)

*Primary Examiner* — Jinsong Hu
*Assistant Examiner* — Rui M Hu
(74) *Attorney, Agent, or Firm* — Viering, Jentschura & Partner mbB

(57) ABSTRACT

This disclosure relates to an antenna array circuitry for analog beamforming, the antenna array circuitry comprising: a plurality of antenna elements, wherein each antenna element is configured to receive a respective analog signal (r(1,t), r(2,t), r(N,t)), wherein the plurality of antenna elements is adjustable based on a code-word, wherein the code-word comprises respective phase configurations ($\theta_p(1)$, $\theta_p(2)$, $\theta_p(N)$) of the plurality of antenna elements, wherein the code-word is based on a superposition of a predetermined set of basic code-words, wherein each basic code-word associates with a corresponding sub-beam, wherein a main radiation lobe of the corresponding sub-beam points in a predefined spatial direction.

17 Claims, 12 Drawing Sheets

(56) References Cited

U.S. PATENT DOCUMENTS

| | | | |
|---|---|---|---|
| 6,331,837 B1* | 12/2001 | Shattil | H04B 7/086 342/383 |
| 9,078,153 B1* | 7/2015 | Schelstraete | H04B 7/0617 |
| 10,431,888 B2* | 10/2019 | Seol | H04B 7/0408 |
| 10,567,022 B2* | 2/2020 | Luo | H04B 7/0617 |
| 10,707,946 B2* | 7/2020 | Ruder | H04B 7/086 |
| 10,944,530 B2* | 3/2021 | Noh | H04L 5/0048 |
| 2003/0064753 A1* | 4/2003 | Kasapi | H04B 7/086 455/446 |
| 2005/0070331 A1* | 3/2005 | Higuchi | H01Q 3/30 455/562.1 |
| 2008/0080641 A1 | 4/2008 | Kim | |
| 2012/0092211 A1* | 4/2012 | Hampel | G01S 13/765 342/175 |
| 2012/0162009 A1* | 6/2012 | Kim | H01Q 25/00 342/372 |
| 2013/0229309 A1 | 9/2013 | Thomas et al. | |
| 2013/0301454 A1* | 11/2013 | Seol | H04B 7/043 370/252 |
| 2013/0322509 A1 | 12/2013 | Harel et al. | |
| 2014/0098689 A1 | 4/2014 | Lee et al. | |
| 2014/0146863 A1* | 5/2014 | Seol | H04B 7/0456 375/224 |
| 2014/0185481 A1* | 7/2014 | Seol | H04W 52/24 370/252 |
| 2014/0206414 A1* | 7/2014 | Oh | H04W 88/10 455/562.1 |
| 2016/0006122 A1* | 1/2016 | Seol | H04B 7/0617 342/372 |
| 2016/0226640 A1* | 8/2016 | Seol | H04B 7/0617 |
| 2016/0315680 A1* | 10/2016 | Braun | H04B 7/0695 |
| 2017/0033847 A1* | 2/2017 | Lomayev | H04B 7/0469 |
| 2017/0331533 A1* | 11/2017 | Strong | G01C 21/18 |
| 2017/0366242 A1 | 12/2017 | Lee et al. | |
| 2018/0224490 A1* | 8/2018 | Brunel | H04B 7/0404 |
| 2018/0227156 A1* | 8/2018 | Papasakellariou | H04L 27/2613 |
| 2018/0269939 A1* | 9/2018 | Hu | H04W 74/006 |
| 2018/0358696 A1* | 12/2018 | Shapoury | H01Q 25/002 |
| 2019/0020402 A1* | 1/2019 | Gharavi | H04B 7/0413 |
| 2019/0020407 A1* | 1/2019 | Gharavi | H04B 7/0617 |
| 2019/0132029 A1* | 5/2019 | Sun | H04B 7/0695 |
| 2019/0132066 A1* | 5/2019 | Park | H04B 17/309 |
| 2019/0199410 A1* | 6/2019 | Zhao | H04W 24/08 |
| 2019/0268117 A1* | 8/2019 | Nilsson | H04W 16/28 |
| 2019/0281607 A1* | 9/2019 | Gao | H04B 7/0408 |
| 2019/0297603 A1* | 9/2019 | Guo | H04W 72/046 |
| 2019/0364452 A1* | 11/2019 | Hwang | H04W 56/001 |
| 2020/0022040 A1* | 1/2020 | Chen | H04W 76/27 |
| 2020/0037260 A1* | 1/2020 | Fu | H04W 80/08 |
| 2020/0100131 A1* | 3/2020 | Yang | H04W 36/04 |
| 2020/0274589 A1* | 8/2020 | Wang | H04L 1/0003 |
| 2020/0274611 A1* | 8/2020 | Mendelsohn | H01Q 1/288 |
| 2020/0275447 A1* | 8/2020 | Zhang | H04W 72/0453 |

OTHER PUBLICATIONS

European Search Repod issued for the EP application No. EP18 18 7481, dated Dec. 20, 2018, 2 pages (for informational purpose only).

* cited by examiner

TECHNIQUES FOR ANALOG BEAMFORMING

CROSS-REFERENCE TO RELATED APPLICATIONS

This application is a national stage entry under 35 U.S.C. § 371 of PCT Application No. PCT/US2019/044338 filed on Jul. 31, 2019, which claims priority to European Application No. 18 187 481.9 filed on Aug. 6, 2018, the contents of which are both incorporated by reference in their entirety.

FIELD

The disclosure relates to techniques for analog beamforming applicable in 5G NR mmWave communications, in particular an antenna array circuitry and a user equipment (UE) circuit comprising such antenna array circuitry. The disclosure further relates to devices and methods of dynamical multi-beam superposition with adaptive gain split within single antenna array and their applications for UE performance optimizations in 5G NR mmWave communications.

BACKGROUND

Analog beam forming is one major feature introduced by 5G NR mmWave communications 100 as exemplarily shown in FIG. 1 where a UE 110 communicates with a serving gNB 120 by forming one or more antenna beams 101, 102, 103 which may be distorted by signals from an interfering gNB 130. Analog beamforming is achieved by antenna arrays (also named as antenna panels). Currently, it is assumed that there is one formed analog beam at the same time per antenna array (antenna panel), or 2 formed analog beams (one Vertical, V beam and one Horizontal, H beam) when considering dual-polarizations. However, H/V beams have dependency with each other, e.g. V/H beams need to provide a UE the antenna diversity for MIMO operations, so they cannot be in totally different directions. Therefore, when a UE needs concurrent operation of multiple independent beams in different directions, it needs more than 1 antenna array to be operating at the same time. This may result in increased antenna array hardware, i.e. increased hardware cost, and/or increased power consumption. Besides, multiple antenna arrays may not fit into the limited space of a cell phone.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description.

FIG. 4b is an exemplary power angle spectrum 400b of the superposed beam shown in FIG. 4a.

DETAILED DESCRIPTION

Figure 1:
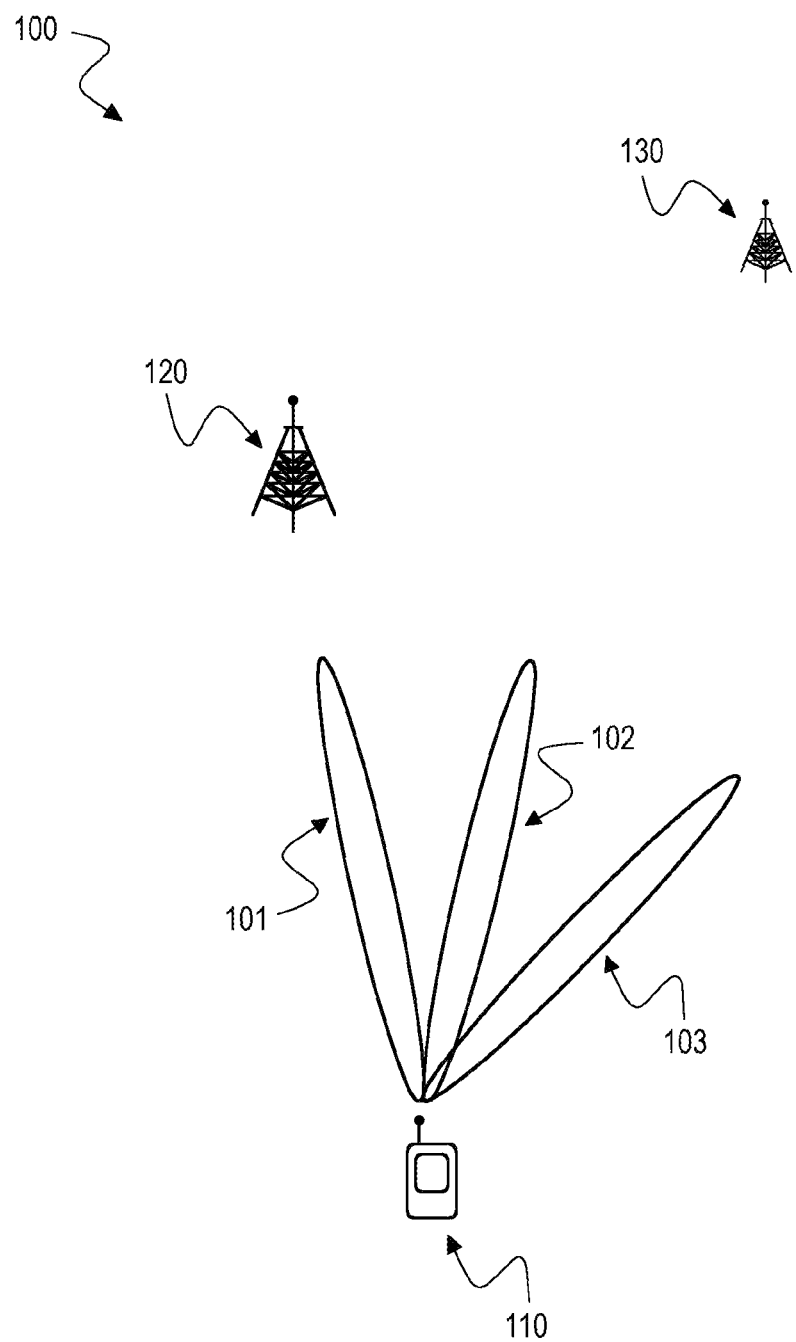
FIG. 1 is an exemplary schematic diagram illustrating a 5G NR mmWave communications system 100 where UEs (User Equipments) 110 communicate with gNBs (or base stations) 120, 130 by applying analog beam forming.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
UE: User Equipment
LTE: Long Term Evolution
mmWave: millimeter-wave
5G NR: 3GPP fifth generation new radio specifications
RX: Receive
TX: Transmit
PDSCH: Physical Downlink shared channel
PDCCH: Physical Downlink control channel
PUSCH: Physical Uplink shared channel
PUCCH: Physical Uplink control channel
CSI-RS: Channel state information reference signals
TDM: time division multiplex
FDM: frequency division multiplex
SSB: synchronization signal block
RAN: radio access network
OFDM: orthogonal frequency division multiplex
gNB: base station according to 5G NR terminology
FW: firmware
HW: hardware SINR: signal plus interference to noise ratio
RSRP: received signal receive power
QCL: quasi-collocation
TRP: transmit-receive point
KPI: Key performance indicator
DMRS: Demodulation reference signal
BLER: block error ratio
ADC: analog-to-digital converter
BLER: block error rate It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with access points and/or base stations. The described devices may include integrated circuits and/or passives and may be manufactured according to various technologies. For example, the circuits may be designed as logic integrated circuits, ASICs, analog integrated circuits, mixed signal integrated circuits, optical circuits, memory circuits and/or integrated passives.

Figure 2:
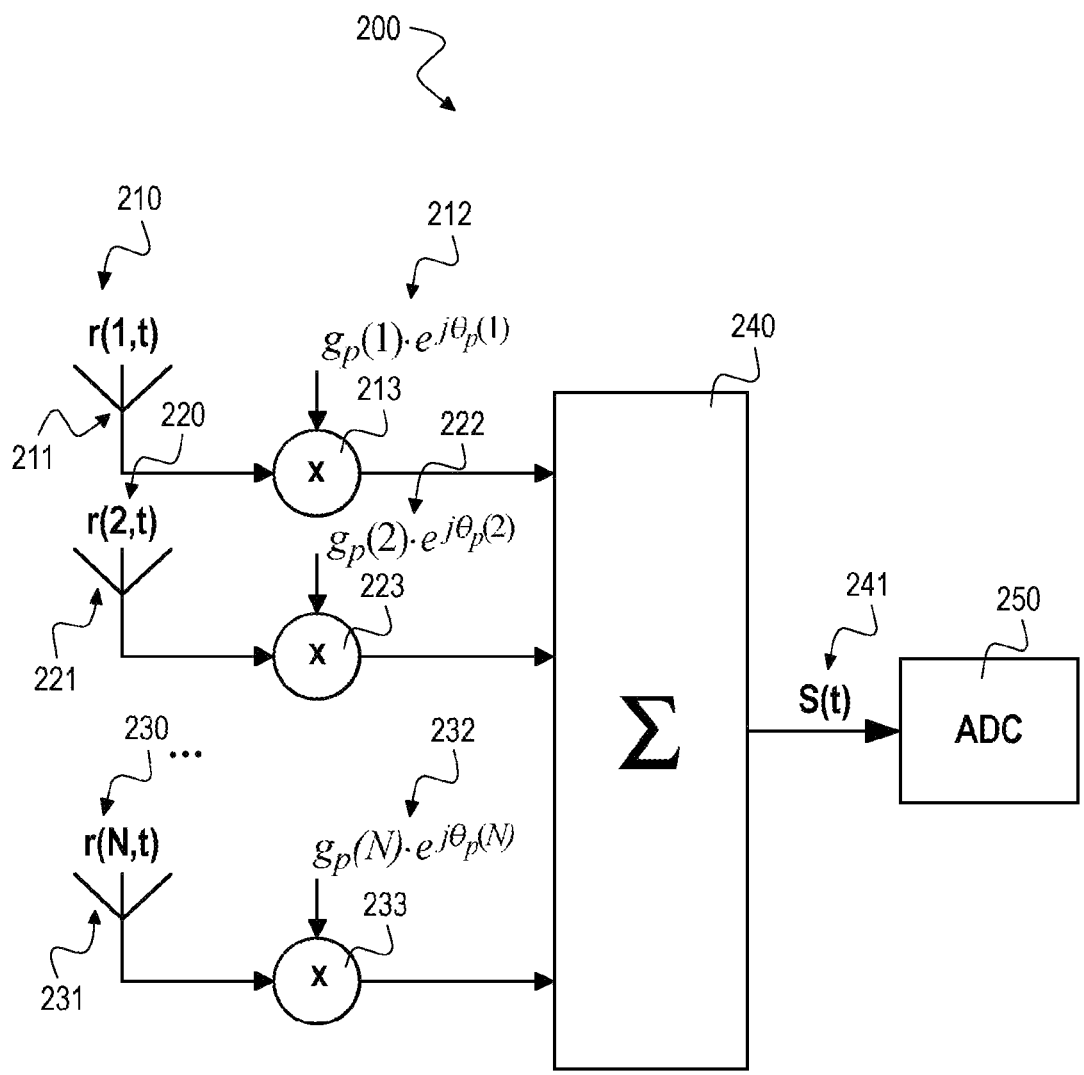
FIG. 2 is an exemplary block diagram illustrating an antenna array 200 for UE RX analog beamforming according to the disclosure.
Figure 9:
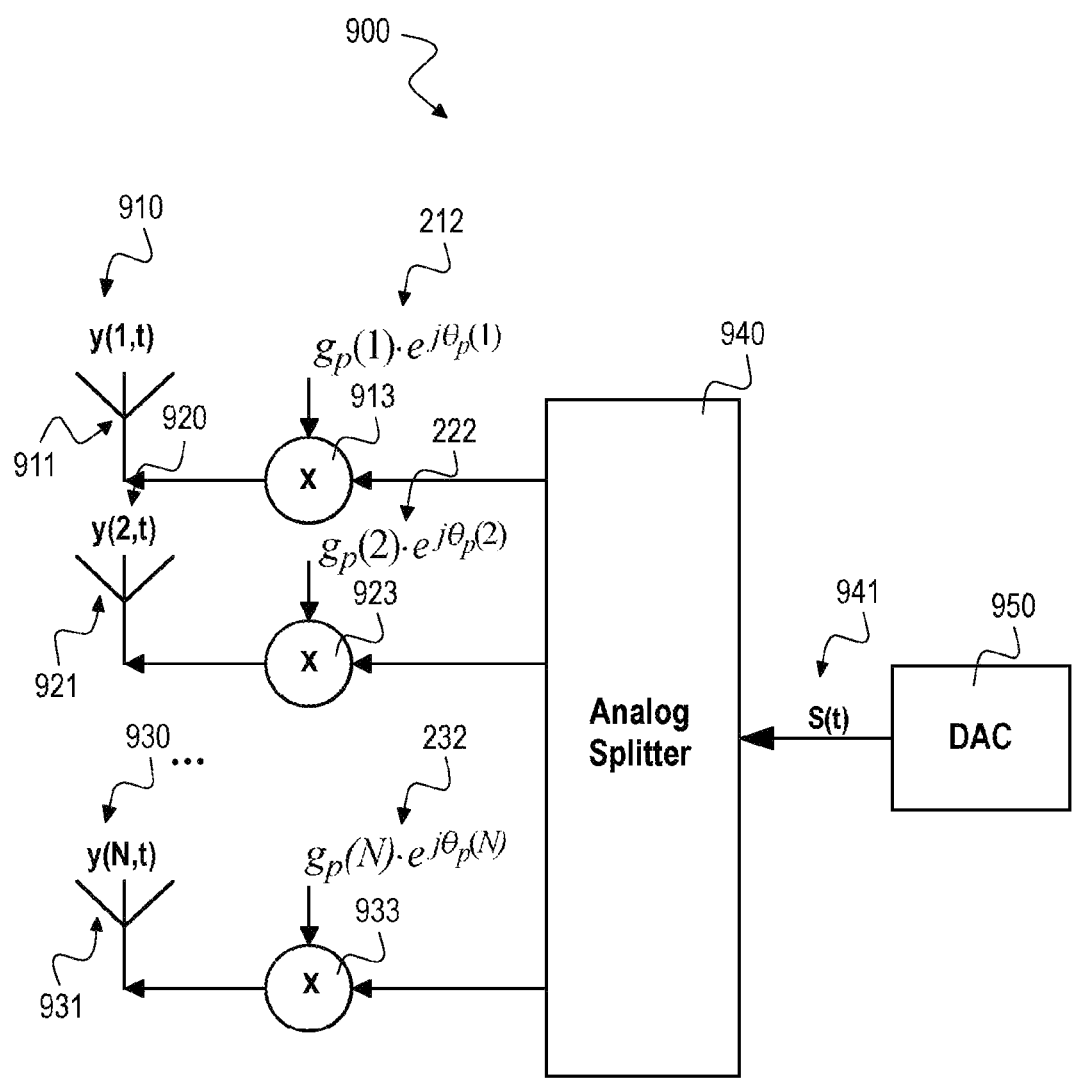
FIG. 9 is an exemplary block diagram illustrating an antenna array for UE TX analog beamforming according to the disclosure.

The techniques described herein may be implemented in antenna arrays, e.g. antenna arrays that may be represented by the antenna array model 200 for UE RX analog beamforming shown in FIG. 2 and/or the antenna model 900 for UE RX analog beamforming shown in FIG. 9.

In the system model of FIG. 2, N is the number of antenna elements 211, 221, 231 within one antenna array 200. r(k,t), k=1, 2, . . . , N is the received analog signal 210, 220, 230 on each antenna element 211, 221, 231 within the antenna array at time t. A vector 212, 222, 232 of phase configurations $\theta_p(k)$, k=1, 2, . . . , N and gain configurations $g_p(k)$, k=1, 2, . . . , N, $g_p(k)>0$ for the antenna elements 211, 221, 231 within the antenna array 200 is called one code-word (a phase vector+optionally a gain vector). For each code-word p, the analog beam-formed signal 241 at receiver side is then represented in the following form:

$$s(t) = \sum_{k=1}^{N} r(k, t) \cdot g_p(k) \cdot e^{j\theta_p(k)} \quad (1)$$

Note that for generality, in the above math model, the gains per antenna element 211, 221, 231 can be different although in some product implementations they can also be assumed to be constant for cost saving.

A fundamental concept of the disclosure presented in the following is to generate multiple beams (i.e. more than one) that work independently, while collaborate concurrently and simultaneously, with one another in covering different directions or angles at the same time by a single antenna array. When UE DL needs to demodulate data traffic from the serving cell PDSCH beam, the UE can at the same time test other candidate beams (e.g. RX beam sweeping) or apply measurement of intra-frequency neighboring cells in different beam directions without interrupting the DL PDSCH demodulation. When a serving cell beam is interfered by a narrow interference beam from a neighbor cell, the interference beam can be nulled in UE receiver side without degrading beam coverage from the serving cell.

First, a method to dynamically superpose a set of pre-optimized sub-beams within one antenna array is provided. The method dynamically selects and maps a set of pre-optimized code-words into a new code-word, where each pre-optimized code-word is associated with a pre-optimized narrow sub-beam in a different direction. The mapping is performed in such a way that the beam formed by the new code-word is equivalent with analog superposition of those sub-beams. The mapping not only considers phase per antenna element but also optionally the gains. Furthermore, consider the total gain per antenna array is limited, the proposed mapping method supports to split different gains for different sub-beams so that trade-off between different sub-beams can be made (e.g. adaptive to channel qualities per sub-beam). This approach does not need HW changes of the classic antenna array as described in the Background section. It achieves analog multi-beam superposition, but avoids additional HW costs of additional phase shifters or additional HW costs of analog combiner within the antenna array.

Based on the basic method, key sub-methods as described in the following are introduced to optimize for 5G NR mmWave UE operations.

A first sub-method is to dynamically superpose a sweeping UE RX sub-beam on top of a constant UE RX sub-beam in a same antenna array, so that UE can apply NR serving cell PDSCH demodulation and NR UE beam sweeping (e.g. CSI-RS based serving beam tracking or SSB based neighboring cell measurement) at the same time without interrupting serving cell DL PDSCH demodulation. Note that in this presented sub-method, compared with classic multi-antenna-array RX operations, hereby the UE RX receives multiple sub-beams of different signals through a single ADC in a single antenna array. In case the signals from different sub-beams are TDMed or FDMed (e.g. CSI-RS based serving beam tracking+PDSCH serving cell demodulation), then there is no inter-beam interference. In case the signals from different sub-beams are neither TDMed nor FDMed (e.g. SSB based neighboring cell measurement+PDSCH serving cell demodulation), inter-beam interference exists. Hereby, the gains can be dynamically split among superposed sub-beams, so that inter-beam interference can be run-time controlled. The split may be based on the run-time channel quality measurement of each sub-beam. Remind that gain splitting is supported by the presented algorithm (see formula (8.1) and formula (8.2)).

Further note that, this sub-method can be extended to dynamically generate two UE RX sub-beams at the same time in different directions from single antenna array, where one sub-beam is for NR PDSCH reception and another sub-beam is for NR PDCCH reception. This is extremely helpful in case PDSCH beam and a different PDCCH beam are scheduled by gNB to be FDMed but in the same OFDM symbols. Note that in current 3GPP NR slot structure, this is still a valid corner case. The method avoids DL demodulation performance drop in UE side in such corner case when the UE has only one activated antenna array at a time.

A second sub-method is to null a narrow neighboring cell beam which is partially overlapping with a serving cell beam. It is done by first detecting the narrow interference beam through UR RX beam sweeping, and then superpose multiple narrow beams within the coverage of serving cell beam but not in the coverage of the narrow interference beam.

First, all the solutions described above may be solved on UE side without needing concurrent operation of multiple antenna arrays. This reduces the power consumption and cost of modem based UEs.

Second, the disclosed method significantly reduces the number of per-optimized code-words before product development because only a set of per-optimized code-words reflecting a set of basic sub-beams need to be stored. Run-time superposition of those basic sub-beams can make UE adapted to different scenarios: e.g. superposition of a couple of neighboring narrow beams leads to a wider beam. This reduces the code-word memory and also significantly reduces the lab characterization time for pre-optimized code-words.

Furthermore, by using the disclosed method, the sub-beams which are superposed are fully synchronized, so the final formed beam after superposition has little inter-beam impairments compared with concurrent multiple antenna array operations which are not perfectly synchronized. This is especially important for UE TX operation which needs strictly time synchronization among TX beams, otherwise the finally formed TX beam can be totally different than expectation.

In the methods, devices and systems described in the following, synchronization signal blocks (SSBs) may be used. In order to connect to the network UEs need to perform initial cell search. The objective of initial cell search is to find a strong cell for potential connection, obtain an estimate of frame timing, obtain cell identifications and find reference signals for demodulation. For this purpose, Primary Synchronization Signals (PSS) and Secondary Synchronization Signals (SSS) are used. PSS and SSS are transmitted in synchronization signal blocks together with the Physical Broadcast Channel (PBCH). The blocks are transmitted per slot at a fixed slot location. During initial cell search the UE correlates received signals and synchronization signal sequences by means of matched filters and performs the following steps: 1. Find Primary Sync Sequence and obtain symbol and frame timing. 2. Find Secondary Sync Sequence and detect CP length and FDD/TDD duplexing method and obtain exact frame timing from matched filter results for PSS and SSS and obtain cell identity from reference signal sequence index. 3. Decode PBCH and obtain basic system information. The Physical Broadcast Channel (PBCH) provides basic system information to UEs. Any UE must decode the information on the PBCH in order to access the cell.

In the following, aspects are described with reference to the drawings, wherein like reference numerals are generally utilized to refer to like elements throughout. In the following description, for purposes of explanation, numerous specific details are set forth in order to provide a thorough understanding of one or more aspects of aspects. However, it may be evident to a person skilled in the art that one or more aspects of the aspects may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or aspects are merely examples, and that other aspects and/or aspects may be utilized and structural and functional modifications may be made without departing from the scope of the present disclosure.

FIG. 2 is a block diagram illustrating an antenna array 200 for UE RX analog beamforming according to the disclosure. The antenna array can be implemented by an antenna array circuitry or generally speaking by an antenna array device. The antenna array circuitry may be part of a radio frequency circuitry, e.g. an RF circuitry of a user equipment. The antenna array circuitry may be used for receiving and processing antenna signals from multiple antenna elements.

The antenna array 200 can be used for analog beamforming in both RX and TX direction. The antenna array 200 comprises a plurality of antenna elements 211, 221, 231. Each antenna element 211, 221, 231 is configured to receive a respective analog signal 210, 220, 230 (r(1,t), r(2,t), r(N,t)). The antenna elements 211, 221, 231 are adjustable based on a code-word 212, 222, 232 which comprises respective phase configurations $\theta_p(1)$, $\theta_p(2)$, $\theta_p(N)$ of the plurality of antenna elements 211, 221, 231. The code-word is based on a superposition of a predetermined set of basic code-words. Each basic code-word associates with a corresponding sub-beam. A main radiation lobe of the predetermined sub-beam points in a predefined spatial direction.

The antenna elements 211, 221, 231 may be configured to receive analog signals in a millimeter wave band. The code-word may comprise respective gain configurations $g_p(1)$, $g_p(2)$, $g_p(N)$ of the plurality of antenna elements 211, 221, 231. The antenna array 200 further comprises a plurality of weighting elements 213, 223, 233 to apply the code-word 212, 222, 232 to the plurality of antenna elements 211, 221, 231. The antenna array 200 further comprises an analog adder 240 configured to add outputs of the plurality of antenna elements 211, 221, 231 weighted by the respective weighting elements 213, 223, 233 to form a composite beam s(t) 241 which may be passed through an analog-to-digital converter 250 to provide a digital representation of s(t).

Based on the system model in formula (1), the naive analog superposition of M sub-beams (p=1, 2 . . . , M) is formulated in the following form. Note that for generality, in our math model, the gains per antenna element can be different ($g_p(k)$, k=1, 2, . . . , N, $g_p(k)>0$), although sometimes in a low-cost product implementation they are constant.

$$s'(t) = \sum_{p=1}^{M} \sum_{k=1}^{N} r(k,t) \cdot g_p(k) \cdot e^{j\theta_p(k)} \quad (2)$$

Clearly, implementation wise, formula (2) needs M*N separated phase shifters and a big analogy combiner per antenna array, which has huge HW costs. So, the native superposition approach in formula (2) is NOT desired.

Hereby the following method is disclosed to achieve superposition of M sub-beams without any additional HW complexity. First, we represent the finally formed beam after superposition in the following form.

$$s'(t) = \sum_{k=1}^{N} r(k,t) \cdot g'(k) \cdot e^{j\theta'(k)} \quad (3)$$

In equation (3), g'(k) and θ'(k) can be viewed as the new code-word applied on the same antenna array. Next, force the beam associated with such new code-word in formula (3) equivalent as the analog combining of M sub-beams as in formula (2), and the following form is obtained:

$$\sum_{k=1}^{N} r(k,t) \cdot g'(k) \cdot e^{j\theta'(k)} = \sum_{p=1}^{M} \sum_{k=1}^{N} r(k,t) \cdot g_p(k) \cdot e^{j\theta_p(k)} \quad (4)$$

By further reformulating formula (4), we get:

$$\sum_{k=1}^{N} r(k,t) \cdot \{g(k) \cdot e^{j\theta'(k)}\} = \sum_{k=1}^{N} r(k,t) \cdot \left\{ \sum_{p=1}^{M} g_p(k) \cdot e^{j\theta_p(k)} \right\} \quad (5)$$

Formula (5) can be further simplified into the following form:

$$g'(k) \cdot e^{j\theta'(k)} = \sum_{p=1}^{M} g_p(k) \cdot e^{j\theta_p(k)}, \, k = 1, 2, \ldots, N \quad (6)$$

Consider g'(k) is real-valued and g'(k)>=0, formula (6) can be analytically solved for both θ'(k) and g'(k), into the following form:

$$\theta'(k) = \arctan\left\{ \frac{\sum_{p=1}^{M} g_p(k) \cdot \sin(\theta_p(k))}{\sum_{p=1}^{M} g_p(k) \cdot \cos(\theta_p(k))} \right\}, \, k = 1, 2, \ldots, N \quad (7.1)$$

$$g'(k) = \sqrt{\left[\sum_{p=1}^{M} g_p(k) \cdot \cos(\theta_p(k))\right]^2 + \left[\sum_{p=1}^{M} g_p(k) \cdot \sin(\theta_p(k))\right]^2}, \quad (7.2)$$
$$k = 1, 2, \ldots, N$$

Note that the newly calculated code-word in (7.1) and (7.2) (θ'(k) and optionally g'(k) in case the gains per antenna element is assumed to be different) exactly represents the new beam which is the analog superposition of M sub-beams. The newly calculated code-word can be programmed as normal code-word in the normal antenna array HW.

Furthermore, in certain scenarios, the sub-beams may have different SINK requirements but the total gain within an antenna array is limited. In this case it is more efficient to distribute different gains for different sub-beams. In our method, this can be done easily by updating formula (7.1) and (7.2) considering a different gain scaling factor per sub-beam. The updated formula is then shown in (8.1) and (8.2) where $F_p$ is the gain scaling factor for sub-beam p and $$\sum_{p=1}^{M} F_p = 1.$$

The new code-word will then represent superposition of different sub-beams with also different gains. The updated code-word mapping including the gain scaling is formulated in the following form:

$$\theta'(k) = \arctan\left\{ \frac{\sum_{p=1}^{M} F_p \cdot g_p(k) \cdot \sin(\theta_p(k))}{\sum_{p=1}^{M} F_p \cdot g_p(k) \cdot \cos(\theta_p(k))} \right\}, \, k = 1, 2, \ldots, N \quad (8.1)$$

$$g'(k) = \sqrt{\left[\sum_{p=1}^{M} F_p \cdot g_p(k) \cdot \cos(\theta_p(k))\right]^2 + \left[\sum_{p=1}^{M} F_p \cdot g_p(k) \cdot \sin(\theta_p(k))\right]^2}, \quad (8.2)$$
$$k = 1, 2N$$

For real product implementation, formula (7.1)/(7.2) and (8.1)/(8.2) can be approximated by a look up tables or polynomial approximations by DSP FW, without additional HW changes. The overall computation load is also very low because the computation is required during UE beam-reconfigurations (semi-statistically). For each re-configuration, the computation complexity scales with number of antenna element N which is also very low: typical values for N in a UE antenna array is 4, 8, 12 or 16. Therefore the proposed method is very practical to be implemented in a real UE modem product.

The disclosed method becomes efficient if the sub-beams to be superposed are carefully selected, which have as less overlapping as possible to avoid cross-talk. Therefore, narrow pre-optimized sub-beams with good directivity may be preferred. Sometimes overlapped side-lobes cannot be avoided but usually they are 10 dB lower than main lobe and the performance impact is minor.

For low-cost antenna panels (arrays) which only allows run-time reconfiguration of phase shifters but keeps constant gains during run-time, simply skip formula (7.2) and formula (8.2), and let $g_p(k)=1$ in formula (7.1) and (8.1). Then the method still holds, including flexibly gain split among superposed sub-beams reflected in formula (8.1).

The antenna array 200 in FIG. 2 was modeled by Matlab. A tool was implemented to visualize the steered beams from the model. The disclosed multi-beam superposition method was implemented in the simulation environment to prove the concepts. In the following example the simulation results of the superposition of 2 beams are shown with different directions using the disclosed method.

The simulation is based on a 1D Antenna array model with 16 antenna elements. Two sub-beams pointing to different directions (−30° and 60°) are to be superposed. The corresponding code-words of the two sub-beams are shown in Table 1 and Table 2.

TABLE 1

| Code-word for sub-beam 1: −30° | | | | | | | |
|---|---|---|---|---|---|---|---|
| Phase/π | 0 | 0.5 | 1 | 1.5 | 0 | 0.5 | 1 | 1.5 |
| Gain/1 | 0.0338 | 0.1305 | 0.2771 | 0.4539 | 0.6368 | 0.8013 | 0.9251 | 0.9915 |
| Phase/π | 0 | 0.5 | 1 | 1.5 | 0 | 0.5 | 1 | 1.5 |
| Gain/1 | 0.9915 | 0.9251 | 0.8013 | 0.6368 | 0.4539 | 0.2771 | 0.1305 | 0.0338 |

TABLE 2

| Code-word for sub-beam 2: +60° | | | | | | | |
|---|---|---|---|---|---|---|---|
| Phase/π | 1.0718 | 0.2058 | 1.3397 | 0.4737 | 1.6077 | 0.7417 | 1.8756 | 1.0096 |
| Gain/1 | 0.9915 | 0.9251 | 0.8013 | 0.6368 | 0.4539 | 0.2771 | 0.1305 | 0.0338 |
| Phase/π | 0 | 1.134 | 0.2679 | 1.4019 | 0.5359 | 1.6699 | 0.8038 | 1.9378 |
| Gain/1 | 0.0338 | 0.1305 | 0.2771 | 0.4539 | 0.6368 | 0.8013 | 0.9251 | 0.9915 |

Based on formula (7.1) and formula (7.2), the code-word associated to the superposed beam from sub-beam 1 and 2 is derived in Table 3.

TABLE 3

| New code-word associate to superposed beam by formula 7.1 and formula 7.2 | | | | | | | |
|---|---|---|---|---|---|---|---|
| Phase/π | 0 | 0.817 | 0.634 | −0.549 | 0.268 | 0.0849 | 0.9019 | 0.2811 |
| Gain/1 | 0.0675 | 0.1419 | 0.2265 | 0.897 | 0.8484 | 0.4226 | 1.7631 | 1.5322 |
| Phase/π | −0.464 | 0.3529 | 0.8301 | 0.0131 | 0.1961 | 0.6208 | 0.5622 | 0.7452 |
| Gain/1 | 0.2231 | 1.6561 | 1.3798 | 0.0526 | 0.7408 | 0.5148 | 0.0507 | 0.0485 |

Figure 3A:
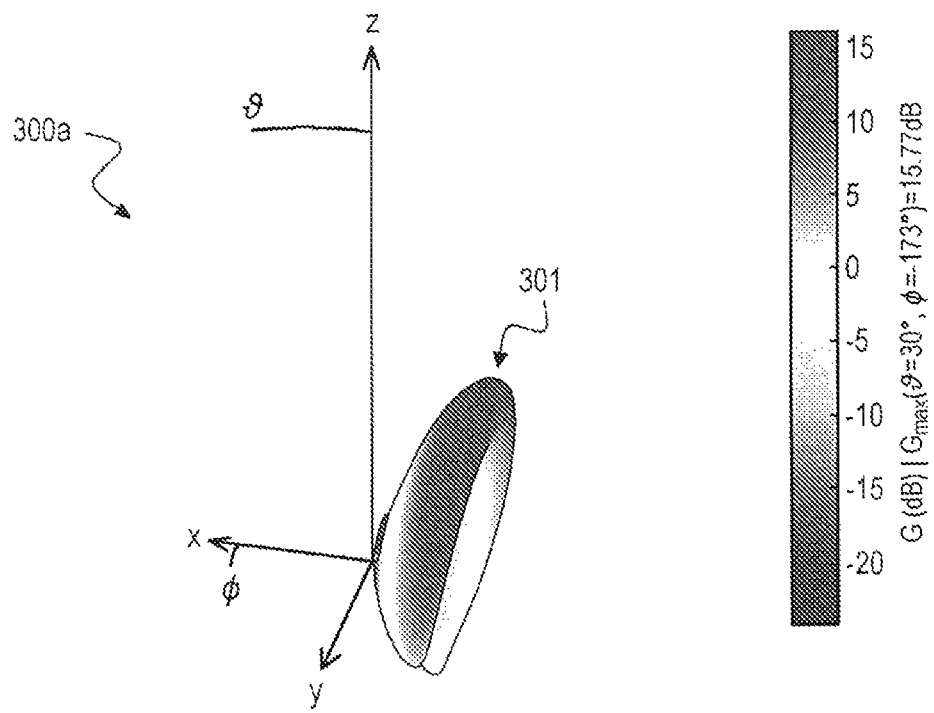
FIG. 3a is an exemplary 3D radiation pattern 300a diagram of an exemplary first sub-beam 301.
Figure 3B:
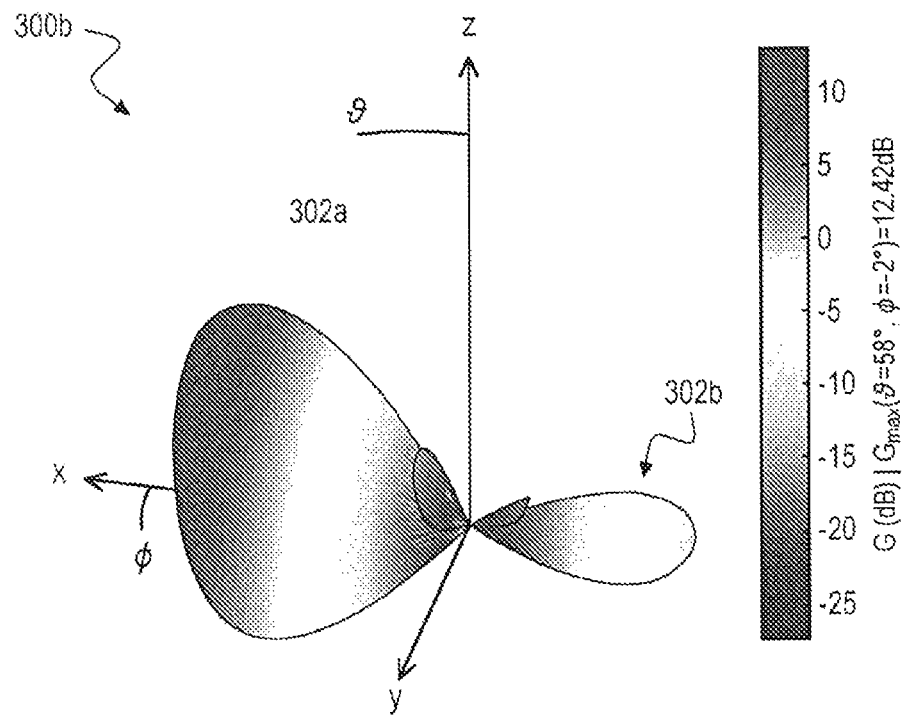
FIG. 3b is an exemplary 3D radiation pattern 300b diagram of an exemplary second sub-beam 302a, 302b.
Figure 4A:
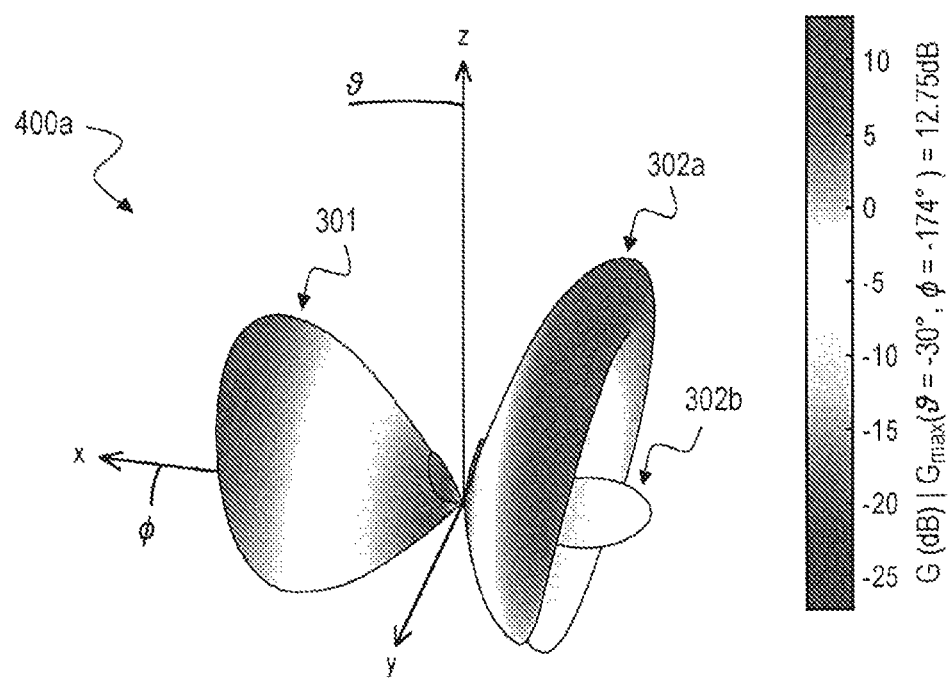
FIG. 4a is an exemplary 3D radiation pattern 400a of a superposed beam resulting from superposition of first 301 and second 302a, 302b sub-beams as shown in FIG. 3.
Figure 4B:
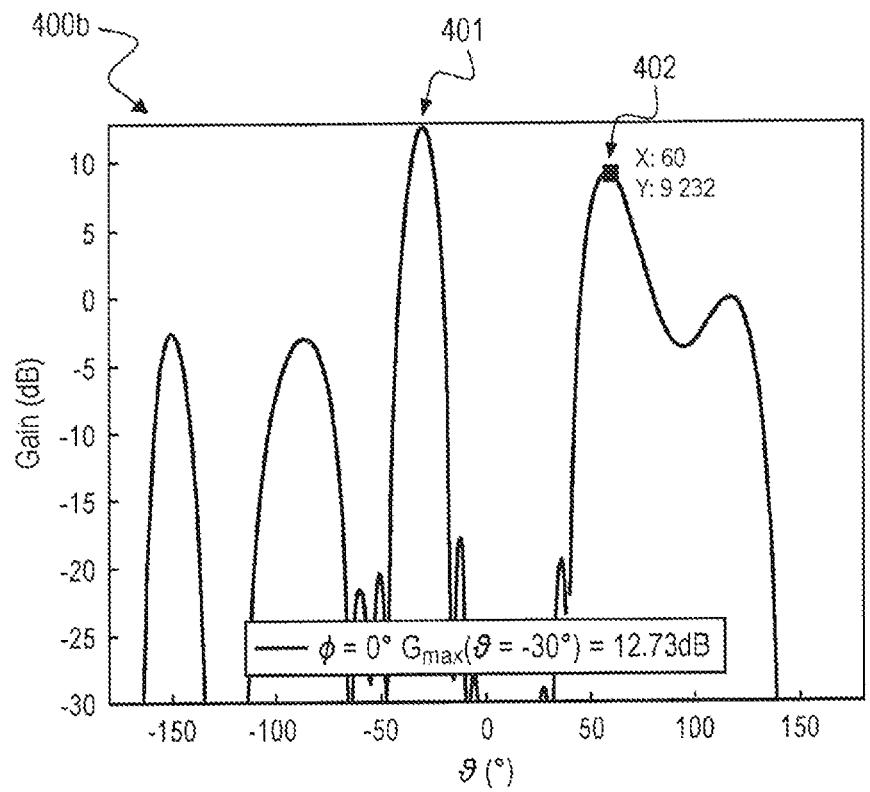

FIGS. 3*a* and 3*b* show the simulation results of steered 3D beam patterns by code-word 1 (Table 1) and code-word 2 (Table 3) separately. FIG. 4*a* shows the steered 3D beam pattern by the new code-word (Table 3), which may be the superposed beam from sub-beam 1 and sub-beam 2 using the disclosed method. FIG. 4*b* shows the power-angle spectrum of the same superposed beam.

FIG. 3*a* shows code-word 1 which has the main component referred to as 301. FIG. 3*b* shows code-word 2 which has the two components referred to as 302*a*, 302*b*. FIG. 4*a* shows the superposed code-word which has superposed components 301, 302*a*, 302*b*.

From the above exemplary simulation figures it can be observed that, by using the disclosed method, the superposition beam in FIG. 4*a* aggregates both beam directions of sub-beam 1 (FIG. 3*a*) and sub-beam 2 (FIG. 3*b*) precisely pursuant to the predetermined target value/threshold. In FIG. 4*b* it can also be observed that the major two power lobes 401, 402 of the superposed beam are exactly reflecting in the main directions of sub-beam 1 (−30°) 301 and sub-beam 2 (60°) 302*a*, 302*b*. FIG. 4*b* further shows that the side lobes after the superposition are more than 10 dB lower than the main lobes, which has only almost no performance impacts.

Based on the fundamental method disclosed above, following sub-methods are disclosed to optimize the single antenna array UE operation for 5G NR mmWave communications. A first sub-method as described in the following is related to concurrent UE beam sweeping and serving cell DL data demodulation. A second sub-method described below is related to neighbor cell Interference TX beam nulling in UE RX side.

In the following, sub-method 1 is described, i.e. UE beam sweeping and serving cell DL data demodulation performed independently, concurrently and simultaneously with one another. In 5G NR, PDSCH carries the DL data traffic. BM CSI-RS is used for serving cell beam tracking. SSB is used for serving cell initial acquisition (RRC IDLE) and then neighboring cell measurement (RRC CONNECTED). When quasi co-location (QCL) information is not on hold (meaning not QCLed, as indicated by the network), these three channels can be from different TX beams from different gNB TRPS but scheduled to be at the same time by the network (e.g. by early discussion with network vendors, both sides agreed that it is possible that the PDSCH and BM CSI-RS used for UE beam sweeping can be scheduled in a same OFDM symbol). Therefore, It is beneficial for UEs to be able to do concurrently processing of serving cell PDSCH demodulation (KPI for DL throughput) and in parallel to apply RX beam sweeping (either CSI-RS based beam sweeping for serving cell beam tracking purpose or SSB based beam sweeping to neighboring cells measurement for handover purpose).

Figure 5A:
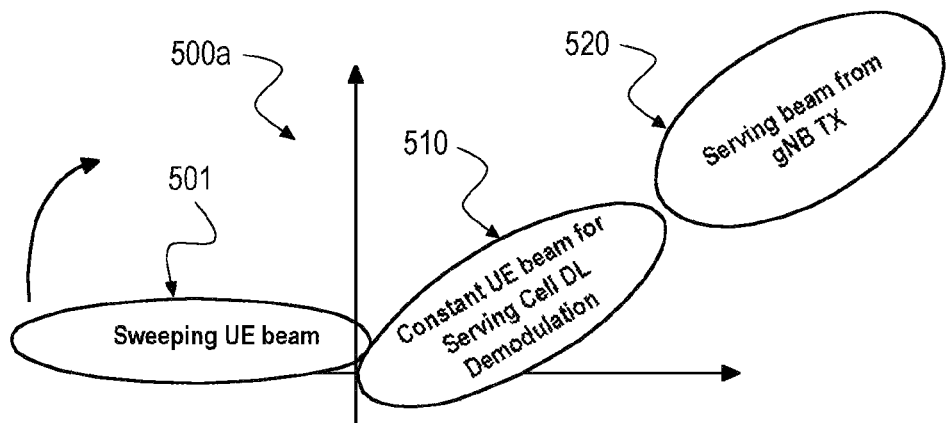
FIGS. 5a, 5b, 5c are exemplary radiation patterns 500a, 500b, 500c illustrating different blocks of a method of concurrent multi-beam generation for concurrent serving cell beam demodulation and neighboring beam sweeping according to the disclosure.
Figure 5B:
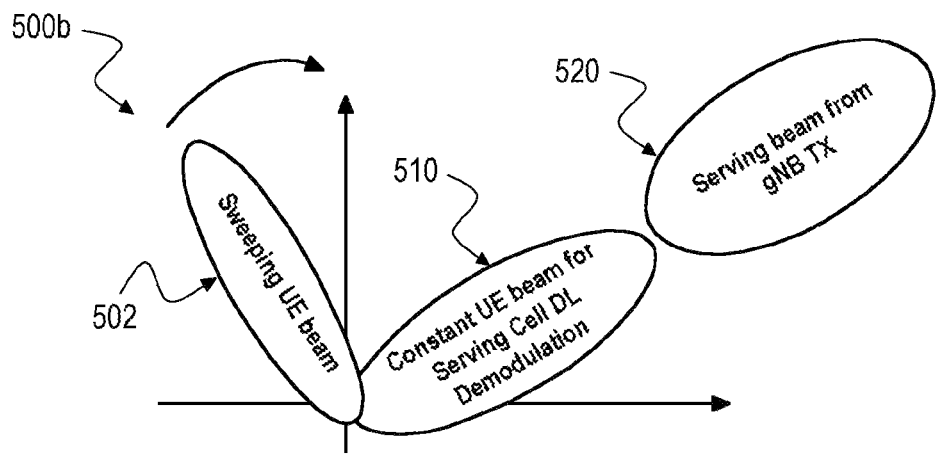
Figure 5C:
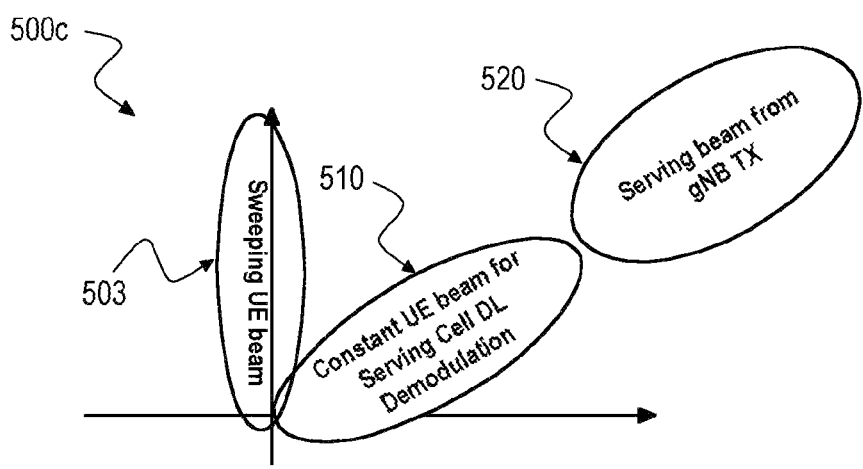

Hereby, sub-method 1 dynamically superposes (time-multiplexed) different UE RX beams (>=1) on top of a constant UE RX beam within a same antenna array, so that UE can do serving cell PDSCH demodulation and RX beam sweeping at the same time, without interrupting the serving cell PDSCH demodulation. One example of this sub-method is shown in FIGS. 5*a*, 5*b* and 5*c*. Note that only 2D space model is shown but it can be easily extended to 3D space model. Note that UE beam sweeping in this figure can be CSI-RS based serving cell beam tracking, or SSB based RRM intra-frequency neighboring cell measurement. And the sweeping beam can be changed in a time-multiplexed manner.

In this disclosed sub-method as shown in FIGS. 5a, 5b and 5c, UE RX receives multiple sub-beams 501, 502, 503, 510 containing different signals through a single ADC in a single antenna array. Hereby it is important to differentiate two use-cases:

Use-case A: The NR DL signals from different sub-beams are TDMed or FDMed. For example, the sweeping beam 501, 502, 503 in FIGS. 5a, 5b, 5c is for CSI-RS based serving cell beam tracking, while the constant beam 510 in FIGS. 5a, 5b, 5c is for PDSCH serving cell demodulation. In this use-case, there is no inter-beam interference.

Use-case B: The NR DL signals from different sub-beams are NOT TDMed or FDMed. For example, the sweeping beam 501, 502, 503 in FIGS. 5a, 5b, 5c is for SSB based neighboring cell measurement and the constant beam 510 in FIGS. 5a, 5b, 5c is for PDSCH serving cell demodulation. In this use-case, inter-beam interferences exist. In this case, baseband can explore interference cancellation algorithms similarly as in LTE cell-edge scenarios to cancel the interferences. As a further enhancement, an implementation is disclosed to dynamically split the gains among superposed sub-beams, so that interference can be run-time controlled. The split can be based on the run-time channel quality measurement of each sub-beam. Note that gain splitting is supported by the disclosed algorithm (see formula (8.1) and formula (8.2)). As one example, the procedure of dynamical gain split for intra-array inter-beam interference control in use-case B is shown in FIG. 6.

Figure 6:
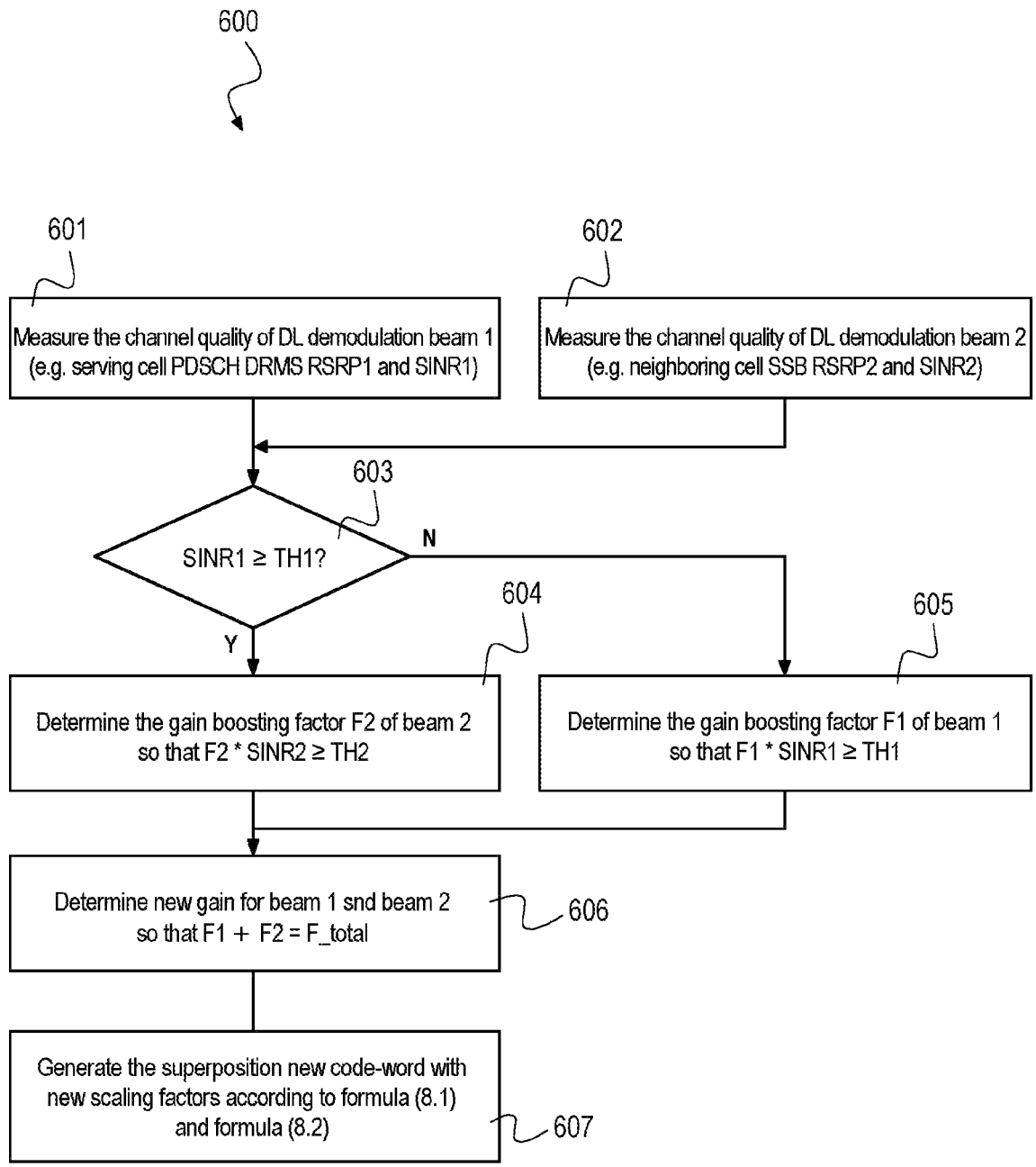
FIG. 6 is an example of dynamical gain split for intra-array inter-beam interference control according to the disclosure.

FIG. 6 is an example of dynamical gain split for intra-array inter-beam interference control according to the disclosure.

In a first block 601 the channel quality of DL demodulation beam 1 is measured, e.g. serving cell PDSCH DMRS RSRP1 and SINR1. In a second block 602, the channel quality of neighboring cell beam 2 is measured, e.g. neighboring cell SSB RSRP2 and SINR2. Then a checking block 603 follows which checks if the condition SINR1>=TH1 is fulfilled. If yes, in a fourth block 604, the gain boosting factor F2 of beam 2 is determined so that F2*SINR2>=TH2. If no, in a fifth block 605, the gain boosting factor F1 of beam 1 is determined so that F1*SINR1>=TH1. Then, in a sixth block 606, new gain for beam 1 and beam 2 is determined so that F2+F1==F_total and finally in a seventh block 607, the superposition new code-word is generated with new scaling factors according to formula (8.1) and formula (8.2).

In FIG. 6, TH2 is a SINR threshold as the minimal the channel quality for neighboring cell measurement (e.g. a typical value is −6 dB). TH1 is the SINR threshold as the minimal channel quality for serving cell PDSCH demodulation (e.g. a typical value is the DMRS SINR mapped to 10% PDSCH BLER). In FIG. 6, consider neighboring cell measurement is usually more robust than serving cell demodulation, the scaling policy in FIG. 6 prioritizes the gain scaling of beam 1 over beam 2.

In this framework of FIG. 6, the priority setting can also be more flexible by adjusting TH1 and TH2 based on inputs of higher layer information or other modem parameters: For example, when UE is in high mobility scenario while at the same time the neighboring cell data base is still empty, neighboring cell measurement has to be prioritized over DL PDSCH demodulation in order to prepare for handover and avoid call drop. In this case, TH1 can be reduced while TH2 can be increased. As a result, based on the framework in FIG. 6 higher gains will be allocated to beam 2 than beam 1.

Further note that, sub-method 1 can be extended to dynamically generate two UE RX sub-beams at the same time in different directions from single antenna array, where one sub-beam is for NR PDSCH reception and another sub-beam is for NR PDCCH reception. The dynamic generation of the two UE RX sub-beams may have the meaning that both (or more) UE RX sub-beams may independently be directed in different directions and may independently change their direction and may apply independent gradients of direction. This is crucial in case PDSCH beam and PDCCH beam are scheduled by gNB to be FDMed but in the same OFDM symbols: note that in current 3GPP NR slot structure, it is a still valid corner case. This avoids performance drop on UE side in such corner case when the UE has only one activated antenna array at a time.

In the following, sub-method 2 is described, i.e. neighbor cell Interference TX beam nulling in UE RX side. In 5G NR network deployment, it may happen that a narrow neighbor gNR TX interference beam (from a neighboring cell) is partially overlapping with a wider serving gNR TX beam (the interference beam can be the serving gNb TX beam for another UE which is co-located). In this case, it makes sense to null the interference beam in UE RX side. Hereby a sub-method (sub-method 2) is disclosed to dynamically null the interference beam. It is done by first detecting the interference beam by UE RX beam sweeping with interference measurement (RSRP and SINR) and then superposing multiple narrow sub-beams within the coverage of serving cell beam but not in the coverage of the interference beam. The concept of this disclosed sub-method 2 is shown in FIGS. 7a, 7b, 7c, 7d and 8.

Figure 7A:
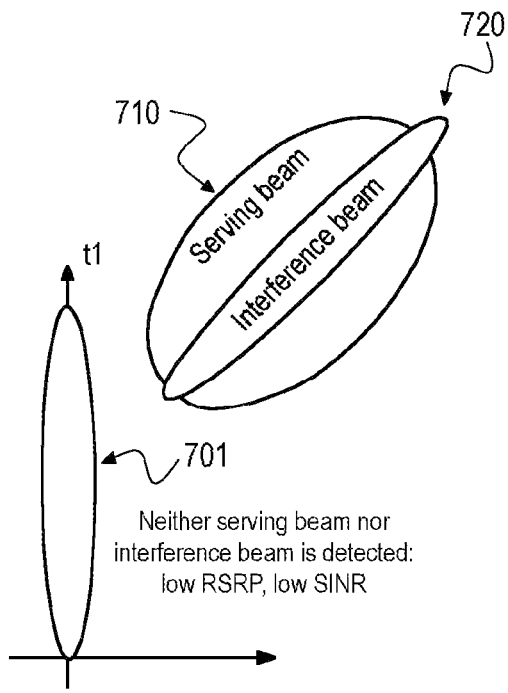
FIGS. 7a, 7b, 7c, 7d illustrate exemplary different blocks of a method of narrow interference beam nulling by concurrent intra-array multi-beam superposition according to the disclosure.
Figure 7B:
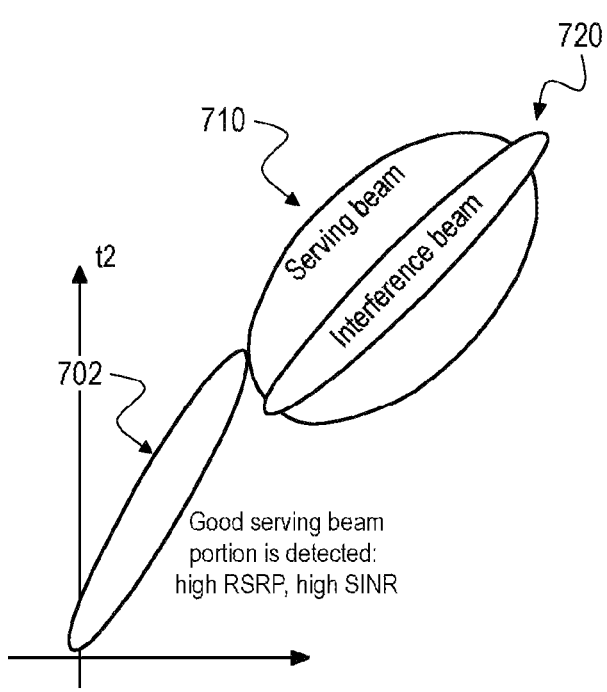
Figure 7C:
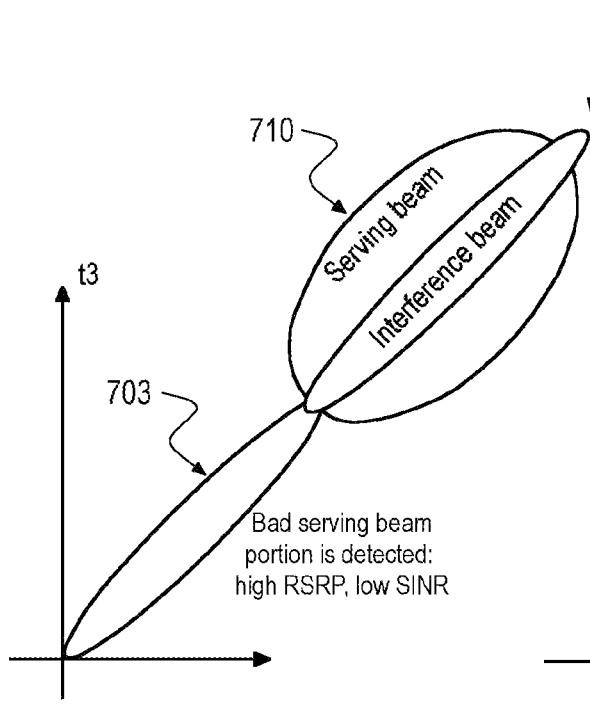
Figure 7D:
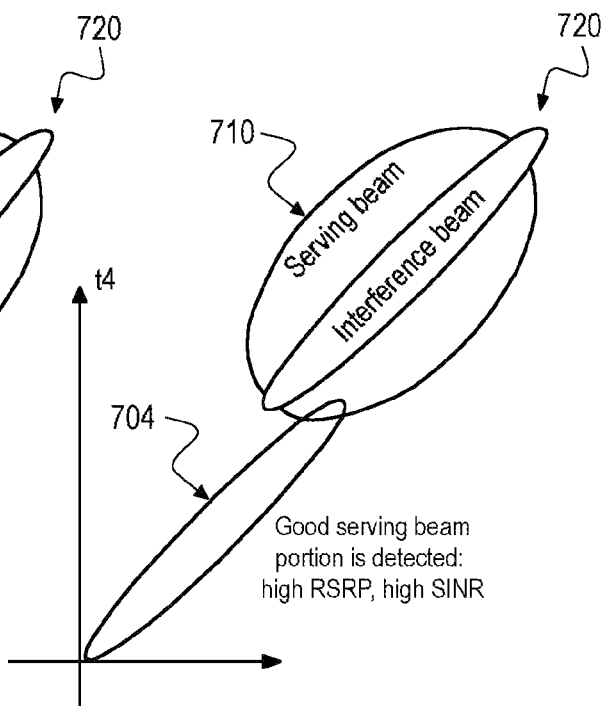
Figure 8:
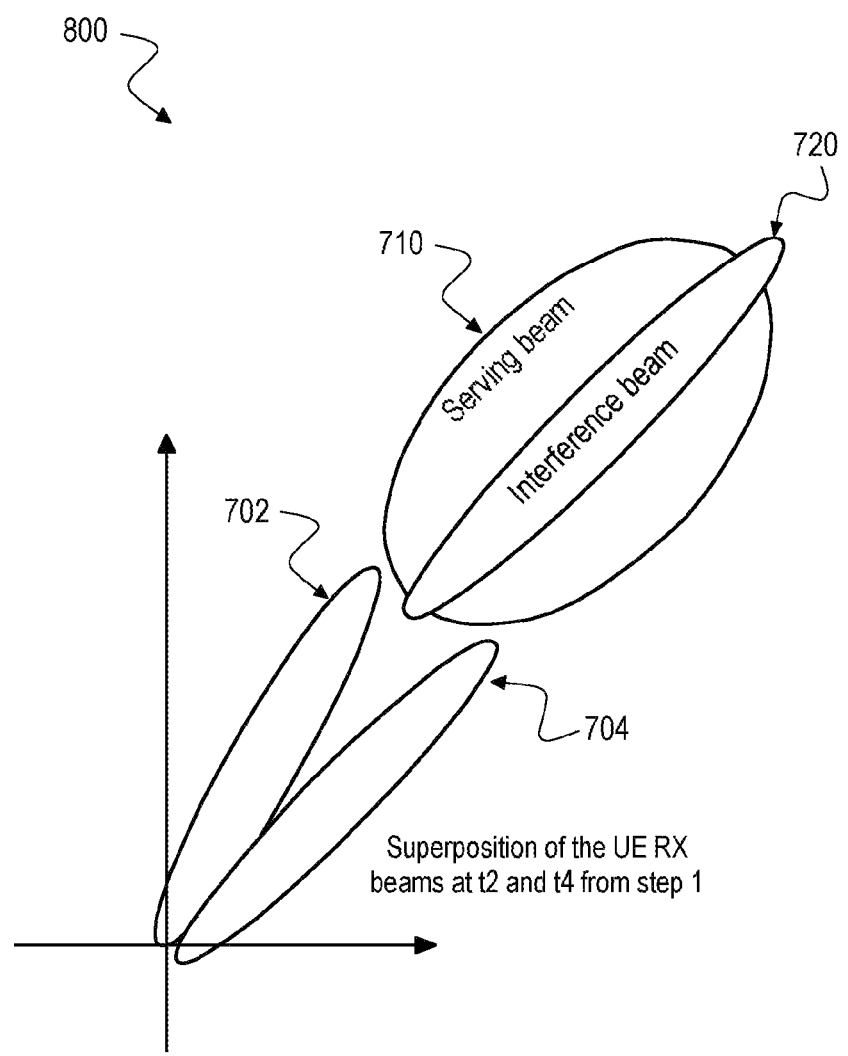
FIG. 8 illustrates an exemplary resulting block of a method of narrow interference beam nulling as shown above with respect to FIGS. 7a, 7b, 7c, 7d.

In the scenario of FIG. 7a that corresponds to time t1, sweeping sub-beam 701 is directed to top direction, while serving beam 710 and interference beam 720 point to another direction. In this scenario, neither serving beam 710 nor interference beam 720 is detected; RSRP is low and SINR is low. In the scenario of FIG. 7b that corresponds to time t2, sweeping sub-beam 702 is directed closer to serving beam 710 and interference beam 720. In this scenario, a good serving beam 710 portion is detected; RSRP is high and SINR is high. In the scenario of FIG. 7c that corresponds to time t3, sweeping sub-beam 703 is directed in the same direction as serving beam 710 and interference beam 720. In this scenario, a bad serving beam 710 portion is detected; RSRP is high and SINR is low. In the scenario of FIG. 7d that corresponds to time t4, sweeping sub-beam 704 is directed close but not in same direction as serving beam 710 and interference beam 720. In this scenario, a good serving beam 710 portion is detected; RSRP is high and SINR is high. In the scenario of FIG. 8, the two sweeping beams 702, 704 from times t2 and t4 according to FIGS. 7b and 7d are superposed.

In FIGS. 7a, 7b, 7c, 7d and 8, compared with previous sub-method 1 where the received RF signals from different sub-beams are un-correlated (different baseband signals from different gNB TRPS), in sub-method 2 each superposed sub-beam receives highly correlated signal (same baseband signal from the same gNB TRP). With certain low probability, the received analog signals from different sub-beams may still have different propagation paths. This may lead to a phase delta among those correlated signals before combining them and feeding them into a single ADC. Such phase delta may lead to self-cancellation of signals after analogy combining due to strong correlation (e.g. when the phase delta is pi, then imagery part may be totally cancelled). Also note that this problem does not happen in classic multiple-array multiple operations because different beams are fed into separated ADCs in different antenna arrays and they are well separated before baseband channel estimation and equalization. Although in most cases such phase delta is zero because gNB TX are co-located, same for UE RX, to make the disclosed sub-method 2 be 100% robust against such issue, the common phase of received signal may be compensated from each superposed sub-beam separately, so that the received coherent signals from different sub-beams have a common phase reference before being combined in front of a single ADC. This may be done in two steps:

First, during beam sweeping steps (e.g. t1, t2, t3, t4 steps in FIGS. 7a, 7b, 7c, 7d), UE baseband measures the absolute phase of received signals (e.g. based on reference signals) from each swept sub-beam 701, 702, 703, 704. Second, when a swept sub-beam 701, 702, 703, 704 is selected to be superposed, update its associated code-word by offsetting its phase shifter settings by the previous estimated common phase, while keeping the gain settings unchanged, in the following:

$$<\theta_p(k), g_p(k)> := <\theta_p(k) - \Delta\theta_p, g_p(k)> k=1, \ldots, N; p=1, \ldots, M \quad (9)$$

Note that $\Delta\theta_p$ in formula (9) is the common phase estimated during RX beam sweeping steps before applying superposition: each swept sub-beam p is associated with a separate common phase estimation (the estimation can be based on reference signals). The updated code-word in formula (9) is further mapped into the new code-word using formula (7.1) and formula (7.2) (or formula 8.1 and formula 8.2 if gain splitting is also considered). By doing this, the new beam associated to the newly mapped code-word is equivalent with the superposition of those updated sub-beams which ensures all received signals from those sub-beams have the common phase basis. This approach solves previously mentioned self-cancellation issue of correlated signals with phase deltas.

In the following, further use cases are described that may be applied with sub-method 1 or sub-method 2 as described above.

As one option, for UE capable with single antenna array activated per time, the UE can support concurrent reception of multiple DL channels which are FDMed but not QCLed (e.g. a paging PDSCH and a SSB which are FDMed within same OFDM symbols). This can be done by concurrently steering multiple UE beams from the same antenna array while each UE beam is associated to a different DL channel. UE can further adaptively split the gains among those channels based KPI parameters estimated from each connectivity: e.g. DL BLER, DL SINR, DL RSRP, or joint considerations.

As a further extension, for UE capable with single antenna array activated per time, the UE can support concurrent multi-connectivity operation while each connectivity is operating in a different carrier frequency within mmWave bands, and each connectivity is communicating with a base station transmission receiver point (TRP) in a different location: One example is in mmWave band multi-sim scenarios. According to this scenario, UE can concurrently steer multiple UE beams from the same antenna array while each UE beam is associated to one connectivity. Furthermore, UE can adaptively split the gains among concurrent UE beams based on the KPI parameters estimated from each connectivity: e.g. DL BLER, DL CQI, DL RSRP, UL BLER or channel types (PDCCH>PDSCH), or joint considerations.

As another further extension, for UE capable with single antenna array activated per time, the UE can support FDD operation in mmWave bands while DL and UL are communicating with gNB but using different UE beams for UL and DL. According to this scenario, UE can concurrently steer two UE beams from the same antenna array while one UE beam is associated to DL reception and another different UE beam is associated to UL transmission. Furthermore, UE can adaptively split the gains among those concurrent UE beams based on the KPI parameters estimated from each connectivity: e.g. DL BLER vs. UL BLER, or channel types (PDCCH>PUCCH>PUSCH with UCI>PSCCH>PUSCH without UCI), or joint considerations.

FIG. 9 is a block diagram illustrating an antenna array 900 for UE TX analog beamforming according to the disclosure.

The antenna array 900 can be used for analog beamforming in both RX and TX direction. The antenna array 900 comprises a plurality of antenna elements 911, 921, 931. Each antenna element 911, 921, 931 is configured to transmit a respective analog signal 910, 920, 930 (y(1,t), y(2,t), y(N,t)). The antenna elements 911, 921, 931 are adjustable based on a code-word 212, 222, 232 which comprises respective phase configurations $\theta_p(1)$, $\theta_p(2)$, $\theta_p(N)$ of the plurality of antenna elements 911, 921, 931, e.g. as described above with respect to FIG. 2. The code-word may be the same code-word or a different code-word as described above with respect to FIG. 2. The code-word is based on a superposition of a predetermined set of basic code-words, e.g. basic code-words 1001, 1002, 1003 as described below with respect to FIG. 10. Each basic code-word associates with a corresponding sub-beam. A main radiation lobe of the corresponding sub-beam points in a predefined spatial direction.

The antenna elements 911, 921, 931 may be configured to transmit analog signals in a millimeter wave band. The code-word may comprise respective gain configurations $g_p(1)$, $g_p(2)$, $g_p(N)$ of the plurality of antenna elements 911, 921, 931. The antenna array 900 further comprises a plurality of weighting elements 913, 923, 933 to apply the code-word 212, 222, 232 to the plurality of antenna elements 911, 921, 931. The antenna array 900 further comprises an analog splitter 940 configured to split a composite beam signal s(t) 941 into subcomponents before being transmitted by the antenna elements 911, 921, 931. A digital-to-analog converter (DAC) 950 may be used to generate the composite beam signal s(t) 941.

The subcomponents of the composite beam signal 941 may include two or more independent sub-beams at the same time instance.

A first superposed sub-beam may comprise serving cell Physical Downlink Shared Channel, PDSCH, signals from a base station and a second superposed sub-beam may comprise serving cell Channel State Information Reference Signal, CSI-RS, synchronization signal block, SSB or Physical Downlink Control Channel, PDCCH, signals from the same base station.

In an implementation form, each sub-beam receives physical downlink control channel, PDCCH, or physical downlink shared channel, PDSCH signals from different connectivities in different carrier frequencies but both within 5G NR frequency range 2, FR2. The different connectivities may be provided by different base stations. Each connectivity may be associated to a respective SIM card.

In an implementation form, each sub-beam transmits physical uplink control channel, PUCCH, or physical uplink shared channel, PUSCH signals to different connectivities in different carrier frequencies but both within 5G NR frequency range 2, FR2. The different connectivities may be provided by different base stations in mmWave bands. Each connectivity may be associated to a respective SIM card.

In an implementation form, the code-word is adapted based on splitting a gain of the code-word between the gain configurations of the at least two sub-beams. The gain split may be based on uplink block error, UL BLER, measurement for each connectivity. The UL BLER may be determined based on counting a number of PUSCH NACKs indicated by the respective base station.

The disclosed methods described above may also be applied with the antenna array 900 for UE TX analog beamforming as shown in FIG. 9.

Figure 10:
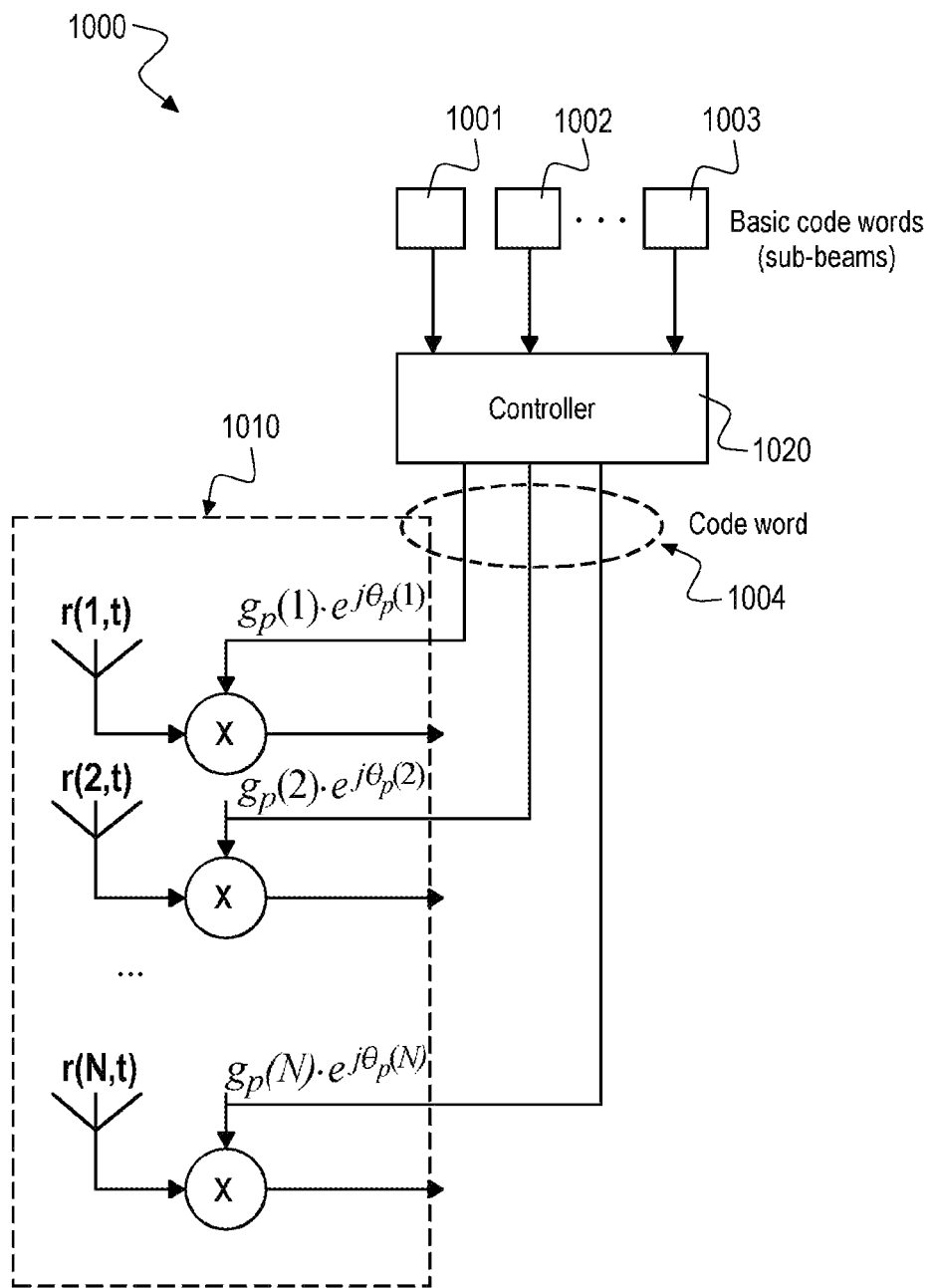
FIG. 10 is an exemplary block diagram illustrating a UE circuit 1000 comprising an antenna array 1010 for analog beamforming according to the disclosure.

FIG. 10 is a block diagram illustrating a UE circuit 1000 comprising an antenna array 1010 for analog beamforming according to the disclosure.

The UE circuit 1000 comprises an antenna array 1010 which is adjustable based on a code-word 1004; and a controller 1020 configured to provide the code-word 1004 based on a superposition of a predetermined set of basic code-words 1001, 1002, 1003. Each basic code-word 1001, 1002, 1003 associates with a corresponding sub-beam and a main radiation lobe of the corresponding sub-beam points in a predefined spatial direction.

The antenna array 1010 may correspond to an antenna array 200 as described above with respect to FIG. 2 or to an antenna array 900 as described above with respect to FIG. 9.

The antenna array 1010 can be used for analog beamforming in both RX and TX direction. The antenna array 1010 comprises a plurality of antenna elements, e.g. antenna elements 211, 221, 231 as described above with respect to FIG. 2. The antenna elements can work independently of one another, and concurrently and simultaneously. Each antenna element 211, 221, 231 is configured to receive a respective analog signal r(1,t), r(2,t), r(N,t). The antenna elements 211, 221, 231 are adjustable based on a code-word 1004, e.g. a code-word 212, 222, 232 as described above with respect to FIG. 2 which comprises respective phase configurations $\theta_p(1)$, $\theta_p(2)$, $\theta_p(N)$ of the plurality of antenna elements 211, 221, 231. The code-word 1004 is based on a superposition of a predetermined set of basic code-words 1001, 1002, 1003. Each basic code-word 1001, 1002, 1003 associates with a corresponding sub-beam. A main radiation lobe of the corresponding sub-beam points in a predefined spatial direction.

The antenna elements 211, 221, 231 may be configured to receive analog signals in a millimeter wave band. The code-word 1004 may comprise respective gain configurations $g_p(1)$, $g_p(2)$, $g_p(N)$ of the plurality of antenna elements 211, 221, 231. The antenna array 200 further comprises a plurality of weighting elements, e.g. weighting elements 213, 223, 233 as described above with respect to FIG. 2 to apply the code-word 1004 to the plurality of antenna elements 211, 221, 231.

The antenna array 1010 may form a composite beam s(t) 241 comprising two or more independent sub-beams at the same time instance.

In an implementation form, a first superposed sub-beam may comprise serving cell Physical Downlink Shared Channel, PDSCH, signals from a base station; and a second superposed sub-beam may comprise serving cell Channel State Information Reference Signal, CSI-RS, or Physical Downlink Control Channel, PDCCH, signals or serving cell SSB from the same base station. The serving cell PDSCH signals and the serving cell CSI-RS or PDCCH signals or SSB may be non-quasi co-located with the serving cell PDSCH signals. In an implementation form, the serving cell PDSCH signals and the CSI-RS or PDCCH signals or the SSB may be included in the same OFDM symbol.

In an implementation form, a first superposed sub-beam may comprise serving cell PDSCH signals from a base station; and a second superposed sub-beam may comprise neighboring cell synchronization signal block, SSB, signals from another base station.

In an implementation form, a first superposed sub-beam may cover a first sub-set of radiation patterns comprising PDSCH, signals; and a second superposed sub-beam may cover a second sub-set of radiation patterns comprising the same PDSCH signals.

Each basic code-word 1001, 1002, 1003 may comprise respective phase configurations $\theta_p(1)$, $\theta_p(2)$, $\theta_p(N)$ of the antenna array 1010 as shown in FIG. 10. Each basic code-word may comprise respective gain configurations $g_p(1)$, $g_p(2)$, $g_p(N)$) of the antenna array 1010 as shown in FIG. 10.

At least two sub-beams may comprise different downlink signals. The controller 1020 may be configured to adapt the code-word based on splitting a gain of the code-word between the gain configurations of the at least two sub-beams. The gain splitting may be based on channel qualities of the at least two sub-beams. The channel qualities may be based on reference signals of the at least two sub-beams. The channel qualities can be based on UL BLER measurement, e.g. UE counting the number of PUSCH NACKs which are indicated by base station. The gain splitting may be based on UE internal information about a neighboring cell database. The gain splitting may be based on mobility information based on UE internal estimates or based on external sensors.

The controller 1020 may be configured to select the sub-beams based on a beam sweeping over a set of candidate sub-beams. The controller 1020 may be configured to determine for each swept candidate sub-beam: a received signal power, a received interference-plus-noise, and a received absolute common phase. The controller 1020 may be configured to perform the beam sweeping based on PDSCH DMRS subcarrier signals or based on PDSCH data subcarrier signals or based on the CSI-RS resources which are co-quasi-collocated with PDSCH.

The controller 1020 may be configured to select a candidate sub-beam for superposition if a receive power (or a received SINR or both) or a received quality of the candidate sub-beam is above a predefined threshold. A basic code-word 1001, 1002, 1003 of each selected candidate sub-beam may be offset by a common phase value.

The antenna array may form a composite beam s(t) 241 comprising two or more independent sub-beams at the same time instance, e.g. as described above with respect to FIG. 2.

A first superposed sub-beam may comprise serving cell Physical Downlink Shared Channel, PDSCH, signals from a base station and a second superposed sub-beam may comprise serving cell Channel State Information Reference Signal, CSI-RS, synchronization signal block, SSB or Physical Downlink Control Channel, PDCCH, signals from the same base station.

In an implementation form, each sub-beam receives physical downlink control channel, PDCCH, or physical downlink shared channel, PDSCH signals from different connectivities in different carrier frequencies but both within 5G NR frequency range 2, FR2. The different connectivities may be provided by different base stations. Each connectivity may be associated to a respective SIM card.

In an implementation form, each sub-beam transmits physical uplink control channel, PUCCH, or physical uplink shared channel, PUSCH signals to different connectivities in different carrier frequencies but both within 5G NR frequency range 2, FR2. The different connectivities may be provided by different base stations in mmWave bands. Each connectivity may be associated to a respective SIM card. 3GPP provides in specification for 5G NR and TS 38.104 section 5.2 the list of bands in which NR (New Radio) can operate. As per 3GPP release 15, these frequency bands are designated for different frequency ranges (FR) and current specification (Release) defines them as FR1 and FR2. FR1 is defined ranging from 450 MHz to 6000 MHz, while FR2 is defined ranging from 24250 MHz to 52600 MHz.

In an implementation form, the code-word is adapted based on splitting a gain of the code-word between the gain configurations of the at least two sub-beams. The gain split may be based on uplink block error, UL BLER, measurement for each connectivity. The UL BLER may be determined based on counting a number of PUSCH NACKs indicated by the respective base station.

Figure 11:
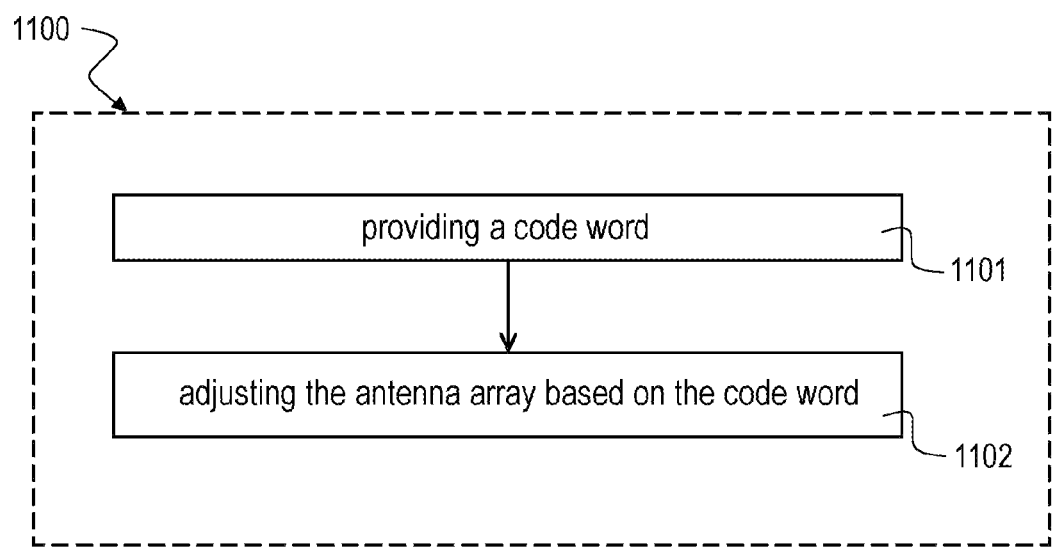
FIG. 11 is an exemplary schematic diagram illustrating a method 1100 for adjusting an antenna array according to the disclosure.

FIG. 11 is a schematic diagram illustrating a method 1100 for adjusting an antenna array according to the disclosure. The method 1100 may be applied with an antenna array 200 described above with respect to FIG. 2 or an antenna array 900 described above with respect to FIG. 9 or an antenna array 1010 described above with respect to FIG. 10.

The method 1100 comprises: providing 1101 a code-word based on a superposition of a predetermined set of basic code-words, wherein each basic code-word associates with a corresponding sub-beam, wherein a main radiation lobe of the corresponding sub-beam points in a predefined spatial direction, e.g. as described above with respect to FIG. 10; and adjusting 1102 the antenna array based on the code-word.

Each basic code-word may comprise respective phase configurations $\theta_p(1)$, $\theta_p(2)$, $\theta_p(N)$ of the antenna array. Each basic code-word may comprise respective gain configurations $g_p(1)$, $g_p(2)$, $g_p(N)$ of the antenna array. At least two sub-beams may be configured to comprise different downlink signals.

The code-word may be adapted based on splitting a gain of the code-word between the gain configurations of the at least two sub-beams. The gain splitting may be based on channel qualities of the at least two sub-beams. The channel qualities may be based on reference signals of the at least two sub-beams. The channel qualities may be based on uplink block error, UL BLER, measurements, e.g. by UE counting the number of PUSCH NACKs which are indicated by the base station.

The gain splitting may be based on UE internal information about a neighboring cell database. The gain splitting may be based on mobility information based on UE internal estimates or based on external sensors.

The method 1100 may further comprise: selecting the sub-beams based on a beam sweeping over a set of candidate sub-beams. The method 1100 may further comprise: determining for each swept candidate sub-beam: a received signal power, a received interference-plus-noise, and a received absolute common phase.

The method 1100 may further comprise: performing the beam sweeping based on PDSCH DMRS subcarrier signals or based on PDSCH data subcarrier signals or based on CSI-RS signals which are indicated to be QCLed with PDSCH.

The method 1100 may further comprise: selecting a candidate sub-beam for superposition if a receive power of the candidate sub-beam is above a predefined threshold. A basic code-word of each selected candidate sub-beam may be offset by a common phase value.

Figure 12:
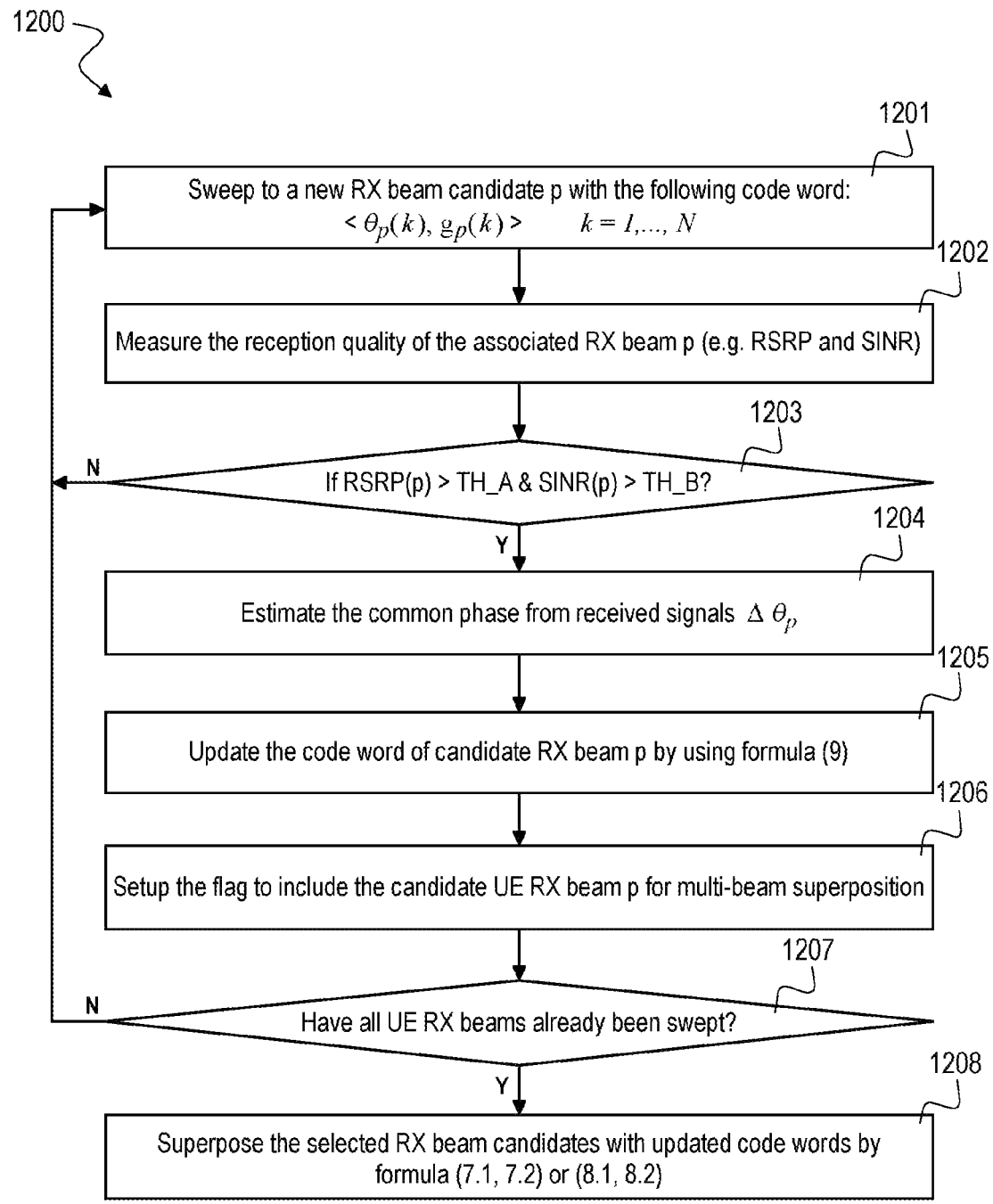
FIG. 12 is an exemplary schematic diagram illustrating a procedure for interference beam nulling according to the disclosure.

FIG. 12 is a schematic diagram illustrating a procedure for interference beam nulling 1200 according to the disclosure. The procedure 1200 describes the beam nulling as exemplarily illustrated in FIGS. 7a, 7b, 7c, 7d and 8 in terms of a method. In a first block 1201 sweeping to a new RX beam candidate p with the following code-word: $<\theta_p(k), g_p(k)>$, k=1 . . . N is performed. In a second block 1202, measuring the reception quality of the associated RX beam p is performed, e.g. RSRP and SINR. In a third block 1203 a check is performed if RSRP(p)>TH_A and SINR(p)>TH_B. TH_A and TH_B are a lower and a higher threshold. If no, the procedure returns to block 1201, if yes, a fourth block 1204 is performed estimating the common phase from received signals, $\Delta\theta_p$. Then, in a fifth block 1205 updating the code-word of candidate RX beam p is performed by using formula (9) described above. In a succeeding sixth block 1206 a flag is setup to include the candidate UE RX beam p for multi-beam superposition. Afterwards, in a seventh block 1207, a check is performed if all UE RX beams have already been swept. If no, the procedure 1200 returns to block 1201, if yes, in an eighth block 1208 the selected RX beam candidates are superposed with updated code-words by formula (7.1, 7.2) or (8.1, 8.2) as described above.

The methods, devices and systems described in this disclosure may be implemented as Digital Signal Processors (DSP), micro-controllers or any other side-processor or hardware circuit on a chip or an application specific integrated circuit (ASIC). Aspects described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above with respect to FIGS. 5 to 8 and 11 and the computing blocks described above with respect to FIGS. 2, 9 and 10. Such a computer program product may include a non-transient readable storage medium storing program code thereon for use by a processor, the program code comprising instructions for performing the methods or the computing blocks as described above.

The following examples pertain to further aspects. Example 1 is an antenna array circuitry for analog beamforming, the antenna array circuitry comprising: a plurality of antenna elements, wherein each antenna element is configured to receive a respective analog signal (r(1,t), r(2,t), r(N,t)), wherein the plurality of antenna elements is adjustable based on a code-word, wherein the code-word comprises respective phase configurations ($\theta_p(1)$, $\theta_p(2)$, $\theta_p(N)$) of the plurality of antenna elements, wherein the code-word is based on a superposition of a predetermined set of basic code-words, wherein each basic code-word associates with a corresponding sub-beam, wherein a main radiation lobe of the corresponding sub-beam points in a predefined spatial direction.

In Example 2, the subject matter of Example 1 can optionally include that the plurality of antenna elements is configured to receive analog signals in a millimeter wave band.

In Example 3, the subject matter of any one of Examples 1-2 can optionally include that the code-word comprises respective gain configurations ($g_p(1)$, $g_p(2)$, $g_p(N)$)) of the plurality of antenna elements.

In Example 4, the subject matter of any one of Examples 1-2 can optionally include: a plurality of weighting elements configured to apply the code-word to the plurality of antenna elements; and an analog adder configured to add outputs of the plurality of antenna elements to form a composite beam ($s(t)$).

In Example 5, the subject matter of any one of Examples 1-2 can optionally include that the antenna array circuitry is configured to form a composite beam comprising at least two independent sub-beams at the same time instance.

In Example 6, the subject matter of Example 5 can optionally include that a first superposed sub-beam is configured to comprise serving cell Physical Downlink Shared Channel, PDSCH, signals from a base station; and that a second superposed sub-beam is configured to comprise serving cell Channel State Information Reference Signal, CSI-RS, synchronization signal block, SSB or Physical Downlink Control Channel, PDCCH, signals from the same base station.

In Example 7, the subject matter of Example 5 can optionally include that each sub-beam receives physical downlink control channel, PDCCH, or physical downlink shared channel, PDSCH signals from different connectivities in different carrier frequencies but both within 5G NR frequency range 2, FR2, that the different connectivities are provided by different base stations, and that multiple connectivities are associated to different base stations or to different transmit-receive points, TRPs, of a same base station.
each sub-beam receives physical downlink control channel, PDCCH, or physical downlink shared channel, PDSCH signals from different connectivities in different carrier frequencies but both within 5G NR frequency range 2, FR2, and that the different connectivities are provided by different base stations, wherein multiple connectivities are associated to different base stations or to different transmit-receive points, TRPs, of a same base station. Note that in FR2, UE TX and UE RX are time multiplexed (TDD operation). Therefore, the gain split for UE TX can be done independently from gain split for UE RX.

In Example 8, the subject matter of Example 5 can optionally include that each sub-beam transmits physical uplink control channel, PUCCH, or physical uplink shared channel, PUSCH signals to different connectivities in different carrier frequencies but both within 5G NR frequency range 2, FR2, and that the different connectivities are provided by different base stations in mmWave bands, each connectivity associated to a respective SIM card.

In Example 9, the subject matter of any one of Examples 7-8 can optionally include that the code-word is adapted based on splitting a gain of the code-word between the gain configurations of the at least two sub-beams, that the gain split for user equipment transmission, UE TX, is based on uplink block error rate, UL BLER, measurement for each connectivity, that the UL BLER is determined based on counting a number of PUSCH NACKs indicated by the respective base station within a predetermined time window, and that the gain split for user equipment reception, UE RX, is based on downlink block error rate, DL BLER, measurement or downlink channel quality measurement for each connectivity.

In Example 10, the subject matter of Example 6 can optionally include that the serving cell CSI-RS, SSB or PDCCH signals are non-quasi co-located with the serving cell PDSCH signals.

In Example 11, the subject matter of Example 6 can optionally include that the serving cell PDSCH signals and the CSI-RS, SSB or PDCCH signals are comprised in a same OFDM symbol.

In Example 12, the subject matter of Example 5 can optionally include that a first superposed sub-beam is configured to comprise serving cell PDSCH signals from a base station; and that a second superposed sub-beam is configured to comprise neighboring cell synchronization signal block, SSB, signals from another base station.

In Example 13, the subject matter of Example 5 can optionally include that a first superposed sub-beam is configured to cover a first sub-set of radiation patterns comprising PDSCH, signals; and that a second superposed sub-beam is configured to cover a second sub-set of radiation patterns comprising the same PDSCH signals.

Example 14 is a user equipment, UE, circuit, comprising: an antenna array circuitry, wherein the antenna array circuitry is adjustable based on a code-word; and a controller configured to provide the code-word based on a superposition of a predetermined set of basic code-words, wherein each basic code-word associates with a corresponding sub-beam, wherein a main radiation lobe of the corresponding sub-beam points in a predefined spatial direction.

In Example 15, the subject matter of Example 14 can optionally include that each basic code-word comprises respective phase configurations ($\theta_p(1)$, $\theta_p(2)$, $\theta_p(N)$) of the antenna array circuitry.

In Example 16, the subject matter of any one of Examples 14-15 can optionally include that each basic code-word comprises respective gain configurations ($g_p(1)$, $g_p(2)$, $g_p(N)$)) of the antenna array circuitry.

In Example 17, the subject matter of Example 16 can optionally include that at least two sub-beams are configured to comprise different downlink signals.

In Example 18, the subject matter of Example 17 can optionally include that the controller is configured to adapt the code-word based on splitting a gain of the code-word between the gain configurations of the at least two sub-beams.

In Example 19, the subject matter of Example 18 can optionally include that the gain splitting is based on channel qualities of the at least two sub-beams.

In Example 20, the subject matter of Example 19 can optionally include that the channel qualities are based on reference signals of the at least two sub-beams.

In Example 21, the subject matter of Example 20 can optionally include that the channel qualities are based on uplink block error, UL BLER, measurements.

In Example 22, the subject matter of Example 18 can optionally include that the gain splitting is based on UE internal information about a neighboring cell database.

In Example 23, the subject matter of Example 18 can optionally include that the gain splitting is based on mobility information based on UE internal estimates or based on external sensors.

In Example 24, the subject matter of any one of Examples 14-15 can optionally include that the controller is configured to select the sub-beams based on a beam sweeping over a set of candidate sub-beams.

In Example 25, the subject matter of Example 24 can optionally include that the controller is configured to determine for each swept candidate sub-beam: a received signal power, a received interference-plus-noise, and a received absolute common phase.

In Example 26, the subject matter of Example 25 can optionally include that the controller is configured to perform the beam sweeping based on PDSCH DMRS subcarrier signals or based on PDSCH data subcarrier signals or based on channel state information reference signal, CSI-RS, resources which are quasi collocated with PDSCH signals.

In Example 27, the subject matter of Example 24 can optionally include that the controller is configured to select a candidate sub-beam for superposition if a receive quality of the candidate sub-beam is above a predefined threshold.

In Example 28, the subject matter of Example 24 can optionally include that a basic code-word of each selected candidate sub-beam is offset by a common phase value.

Example 29 is a method for adjusting an antenna array circuitry, the method comprising: providing a code-word based on a superposition of a predetermined set of basic code-words, wherein each basic code-word associates with a corresponding sub-beam, wherein a main radiation lobe of the corresponding sub-beam points in a predefined spatial direction; and adjusting the antenna array circuitry based on the code-word.

In Example 30, the subject matter of Example 29 can optionally include that each basic code-word comprises respective phase configurations ($\theta_p(1)$, $\theta_p(2)$, $\theta_p(N)$) of the antenna array circuitry.

In Example 31, the subject matter of any one of Examples 29-30 can optionally include that each basic code-word comprises respective gain configurations ($g_p(1)$, $g_p(2)$, $g_p(N)$)) of the antenna array circuitry.

In Example 32, the subject matter of Example 31 can optionally include that at least two sub-beams are configured to comprise different downlink signals.

In Example 33, the subject matter of Example 32 can optionally include: adapting the code-word based on splitting a gain of the code-word between the gain configurations of the at least two sub-beams.

In Example 34, the subject matter of Example 33 can optionally include that the gain splitting is based on channel qualities of the at least two sub-beams.

In Example 35, the subject matter of Example 34 can optionally include that the channel qualities are based on reference signals of the at least two sub-beams.

In Example 36, the subject matter of Example 33 can optionally include that the gain splitting is based on UE internal information about a neighboring cell database.

In Example 37, the subject matter of Example 33 can optionally include that the gain splitting is based on mobility information based on UE internal estimates or based on external sensors.

In Example 38, the subject matter of any one of Examples 29-30 can optionally include: selecting at least two sub-beams based on a beam sweeping over a set of candidate sub-beams.

In Example 39, the subject matter of Example 38 can optionally include: determining for each swept candidate sub-beam: a received signal power, a received interference-plus-noise, and a received absolute common phase.

In Example 40, the subject matter of Example 39 can optionally include: performing the beam sweeping based on PDSCH DMRS subcarrier signals or based on PDSCH data subcarrier signals or based on channel state information reference signals, CSI-RS, which are indicated to be quasi-collocated with PDSCH signals.

In Example 41, the subject matter of Example 38 can optionally include: selecting a candidate sub-beam for superposition if a receive power of the candidate sub-beam is above a predefined threshold.

In Example 42, the subject matter of Example 38 can optionally include that a basic code-word of each selected candidate sub-beam is offset by a common phase value.

Example 43 is a device for adjusting an antenna array circuitry, the device comprising: means for providing a code-word based on a superposition of a predetermined set of basic code-words, wherein each basic code-word associates with a corresponding sub-beam, wherein a main radiation lobe of the corresponding sub-beam points in a predefined spatial direction; and means for adjusting the antenna array circuitry based on the code-word.

In Example 44, the subject matter of Example 43 can optionally include that each basic code-word comprises respective phase configurations ($\theta_p(1)$, $\theta_p(2)$, $\theta_p(N)$) of the antenna array circuitry.

In Example 45, the subject matter of any one of Examples 43-44 can optionally include that each basic code-word comprises respective gain configurations ($g_p(1)$, $g_p(2)$, $g_p(N)$)) of the antenna array circuitry.

Example 46 is a computer readable non-transitory medium on which computer instructions are stored which when executed by a computer cause the computer to perform the method of any one of Examples 29 to 42.

Example 47 is a system, comprising: an antenna array circuitry comprising a plurality of antenna elements, wherein the antenna elements are adjustable based on a code-word; a controller configured to provide the code-word based on a superposition of a predetermined set of basic code-words, wherein each basic code-word associates with a corresponding sub-beam, wherein a main radiation lobe of the corresponding sub-beam points in a predefined spatial direction; a plurality of weighting elements configured to apply the code-word to the plurality of antenna elements; and an analog adder configured to add outputs of the plurality of antenna elements to form a composite beam (s(t)).

In Example 48, the subject matter of Example 47 can optionally include that the composite beam comprises at least two independent sub-beams at the same time instance.

Example 49 is a method of dynamical user equipment beamforming in mmWave bands within one antenna, where the formed beam is the superposition of multiple sub-beams whose main radiation lobes are in different spatial directions.

In Example 50, the subject matter of Example 49 can optionally include that the beam forming is achieved by dynamically selecting a set of code-words each associated to a pre-optimized sub-beam and map them into a new code-word, wherein a code-word consists of a set of phase shifter settings and a set of gain settings while each pair of phase shifter and gain setting is applied per antenna element within one antenna array circuitry.

In Example 51, the subject matter of any one of Examples 49-50 can optionally include that at the same time instance, one superposed sub-beam carries serving cell PDSCH signals from a base station, while another superposed sub-beam carries serving cell beam management CSI-RS signals in the same OFDM symbol from the same base station but not quasi co-located (QCLed) with its PDSCH.

In Example 52, the subject matter of any one of Examples 49-50 can optionally include that at the same time instance, one superposed sub-beam carries serving cell PDSCH signals from one base station while another superposed sub-beam carries PDCCH signals from the same base station in the same OFDM symbol but not co-located (QCLed) with its PDSCH.

In Example 53, the subject matter of any one of Examples 49-50 can optionally include that at the same time instance, one superposed sub-beam carries serving cell PDSCH signals from one base station TRP (Transmit-Receive Point) while another superposed sub-beam carries neighboring cell SSB signals from a different base station TRP.

In Example 54, the subject matter of any one of Examples 51-53 can optionally include that UE dynamically splits the gain portions between the superposed two sub-beams carrying different downlink signals.

In Example 55, the subject matter of Example 54 can optionally include that the gain splitting is based on the channel quality measurements from reference signals in different sub-beams.

In Example 56, the subject matter of Example 54 can optionally include that the gain splitting is based on UE modem internal information of neighboring cell database.

In Example 57, the subject matter of Example 54 can optionally include that the gain splitting is based on mobility information from UE modem internal estimates or be based on mobility information from external sensors.

In Example 58, the subject matter of any one of Examples 49-50 can optionally include that at the same time instance, one superposed sub-beam covers a sub-set of spatial coverage of base station TRP transmission radian pattern transmitting downlink PDSCH signals, while another superposed sub-beam covers a different sub-set of spatial coverage of the same base station TRP transmission radian pattern transmitting the same PDSCH downlink signals.

In Example 59, the subject matter of Example 58 can optionally include that the sub-beams which are superposed based on Example 49 or Example 50 are selected by first sweeping a set of narrow sub-beam candidates.

In Example 60, the subject matter of Example 59 can optionally include that during candidate sub-beam sweeping, for each swept sub-beam candidate, UE measures the received useful signal power, the received interference plus noise power, and the absolute common phase of the received useful signal.

In Example 61, the subject matter of Example 60 can optionally include that the measurement is based on PDSCH DMRS sub-carrier signals.

In Example 62, the subject matter of Example 60 can optionally include that the measurement is based on PDSCH data sub-carrier signals.

In Example 63, the subject matter of Example 59 can optionally include that a candidate sub-beam is selected to be superposed only if the measured received power are higher than a pre-defined threshold, meanwhile the measured signal noise interference ratio (SINR) is higher than another pre-defined threshold.

In Example 64, the subject matter of Example 58 can optionally include that the code-word of each selected superposed sub-beam, which is used to determine the superposition code-word, is offset by a common phase value estimated during the RX beam sweeping steps in Example 60, when the selected sub-beam is applied.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. An antenna array circuitry for analog beamforming, the antenna array circuitry comprising:
   a plurality of antenna elements, wherein each antenna element is configured to receive a respective analog signal, wherein the plurality of antenna elements is adjustable based on a code-word,
   wherein the code-word comprises respective phase configurations of the plurality of antenna elements,
   wherein the code-word is based on a superposition of a predetermined set of basic code-words, wherein each basic code-word associates with a corresponding sub-beam, wherein a main radiation lobe of the corresponding sub-beam points in a predefined spatial direction,
   wherein each sub-beam is configured to receive physical downlink control channel (PDCCH) or physical downlink shared channel (PDSCH) signals from different connectivities in different carrier frequencies but both within 5G NR frequency range 2 (FR2),
   wherein the signals are provided by different base stations,
   wherein the signals are associated to different base stations or to different transmit-receive points (TRPs) of a same base station,
   wherein the antenna array circuitry is configured to form a composite beam comprising at least two independent sub-beams at the same time instance,
   wherein the code-word is adapted based on splitting a gain of the code-word between gain configurations of the at least two independent sub-beams,
   wherein the gain configurations of the at least two independent sub-beams for user equipment transmission (UE TX) are based on uplink block error rate (UL BLER) measurement,
   wherein the UL BLER is determined based on counting a number of PUSCH NACKs indicated by the respective base station within a predetermined time window, and
   wherein the gain configurations of the at least two independent sub-beams for user equipment reception (UE RX) are based on downlink block error rate (DL BLER) measurement or downlink channel quality measurement.

2. The antenna array circuitry of claim 1, wherein the plurality of antenna elements is configured to receive analog signals in a millimeter wave band.

3. The antenna array circuitry of claim 1, wherein the code-word comprises respective gain configurations of the plurality of antenna elements.

4. The antenna array circuitry of claim 1, comprising:
a plurality of weighting elements configured to apply the code-word to the plurality of antenna elements; and
an analog adder configured to add outputs of the plurality of antenna elements to form the composite beam.

5. The antenna array circuitry of claim 1,
wherein a first superposed sub-beam of the at least two independent sub-beams is configured to comprise serving cell Physical Downlink Shared Channel (PDSCH) signals from a base station; and
wherein a second superposed sub-beam of the at least two independent sub-beams is configured to comprise serving cell Channel State Information Reference Signal (CSI-RS) synchronization signal block (SSB), or Physical Downlink Control Channel (PDCCH) signals from the same base station.

6. The antenna array circuitry of claim 5, wherein the serving cell CSI-RS, SSB, or PDCCH signals are non-quasi co-located with the serving cell PDSCH signals.

7. The antenna array circuitry of claim 5, wherein the serving cell PDSCH signals and the CSI-RS, SSB, or PDCCH signals are comprised in a same OFDM symbol.

8. The antenna array circuitry of claim 1,
wherein each sub-beam transmits physical uplink control channel (PUCCH) or physical uplink shared channel (PUSCH) signals in different carrier frequencies but both within 5G NR frequency range 2 (FR2),
wherein the different signals are provided by different base stations in mmWave bands, each signal being associated to a respective SIM card.

9. The antenna array circuitry of claim 1,
wherein a first superposed sub-beam is configured to comprise serving cell PDSCH signals from a base station; and
wherein a second superposed sub-beam is configured to comprise neighboring cell synchronization signal block, SSB, signals from another base station.

10. The antenna array circuitry of claim 1,
wherein a first superposed sub-beam of the at least two independent sub-beams is configured to cover a first sub-set of radiation patterns comprising PDSCH, signals; and
wherein a second superposed sub-beam of the at least two independent sub-beams is configured to cover a second sub-set of radiation patterns comprising the same PDSCH signals.

11. A user equipment (UE) circuit, comprising:
an antenna array circuitry, wherein the antenna array circuitry is adjustable based on a code-word; and
a controller configured to provide the code-word based on a superposition of a predetermined set of basic code-words, wherein each basic code-word associates with a corresponding sub-beam, wherein a main radiation lobe of the corresponding sub-beam points in a predefined spatial direction, wherein each sub-beam is configured to receive physical downlink control channel (PDCCH) or physical downlink shared channel (PDSCH) signals from different connectivities in different carrier frequencies but both within 5G NR frequency range 2 (FR2),
wherein the signals are provided by different base stations, wherein the signals are associated to different base stations or to different transmit-receive points (TRPs) of a same base station,
wherein the antenna array circuitry is configured to form a composite beam comprising at least two independent sub-beams at the same time instance,
wherein the code-word is adapted based on splitting a gain of the code-word between gain configurations of the at least two independent sub-beams,
wherein the gain configurations of the at least two independent sub-beams for user equipment transmission (UE TX) are based on uplink block error rate (UL BLER) measurement,
wherein the UL BLER is determined based on counting a number of PUSCH NACKs indicated by the respective base station within a predetermined time window, and
wherein the gain configurations of the at least two independent sub-beams for user equipment reception (UE RX) are based on downlink block error rate (DL BLER) measurement or downlink channel quality measurement.

12. The UE circuit of claim 11, wherein each basic code-word comprises respective phase configurations of the antenna array circuitry.

13. The UE circuit of claim 11, wherein each basic code-word comprises respective gain configurations of the antenna array circuitry.

14. The UE circuit of claim 13, wherein the at least two independent sub-beams are configured to comprise different downlink signals.

15. A method for adjusting an antenna array circuitry, the method comprising:
providing a code-word based on a superposition of a predetermined set of basic code-words, wherein each basic code-word associates with a corresponding sub-beam, wherein a main radiation lobe of the corresponding sub-beam points in a predefined spatial direction;
receiving on each sub-beam physical downlink control channel (PDCCH) or physical downlink shared channel (PDSCH) signals from different connectivities in different carrier frequencies from different base stations but both within 5G NR frequency range 2 (FR2), wherein the signals are associated to different base stations or to different transmit-receive points (TRPs) of a same base station;
forming a composite beam comprising at least two independent sub-beams at the same time instance;
adapting the code-word based on splitting a gain of the code-word between gain configurations of the at least two independent sub-beams,
wherein the gain configurations of the at least two independent sub-beams for user equipment transmission (UE TX) are based on uplink block error rate (UL BLER) measurement
wherein the gain configurations of the at least two independent sub-beams for user equipment reception (UE RX) are based on downlink block error rate (DL BLER) measurement or downlink channel quality measurement;
determining the UL BLER based on counting a number of PUSCH NACKs indicated by the respective base station within a predetermined time window; and
adjusting the antenna array circuitry based on the code-word.

16. The method of claim 15, wherein each basic code-word comprises respective phase configurations of the antenna array circuitry.

17. The method of claim 15, wherein each basic codeword comprises respective gain configurations of the antenna array circuitry.

\* \* \* \* \*